US009608796B2

(12) United States Patent
Merlin et al.

(10) Patent No.: US 9,608,796 B2
(45) Date of Patent: Mar. 28, 2017

(54) METHODS AND SYSTEMS FOR FREQUENCY MULTIPLEXED COMMUNICATION IN DENSE WIRELESS ENVIRONMENTS

(71) Applicant: QUALCOMM Incorporated, San Diego, CA (US)

(72) Inventors: Simone Merlin, Solana Beach, CA (US); Gwendolyn Denise Barriac, Encinitas, CA (US); Hemanth Sampath, San Diego, CA (US); Sameer Vermani, San Diego, CA (US); Bin Tian, San Diego, CA (US); Yan Zhou, San Diego, CA (US); Rahul Tandra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/265,269

(22) Filed: Apr. 29, 2014

(65) Prior Publication Data
US 2014/0328236 A1 Nov. 6, 2014

Related U.S. Application Data

(60) Provisional application No. 61/819,096, filed on May 3, 2013, provisional application No. 61/846,579, filed on Jul. 15, 2013.

(51) Int. Cl.
*H04L 5/00* (2006.01)
*H04B 7/26* (2006.01)
(Continued)

(52) U.S. Cl.
CPC ............ *H04L 5/0073* (2013.01); *H04B 7/26* (2013.01); *H04B 7/2621* (2013.01); *H04J 1/02* (2013.01);
(Continued)

(58) Field of Classification Search
CPC .. H04B 7/2621; H04J 1/02; H04J 1/14; H04L 1/18; H04L 5/0005; H04L 5/0012;
(Continued)

(56) References Cited

U.S. PATENT DOCUMENTS 7,436,801 B1 * 10/2008 Kanterakis .......... H04W 74/008
370/329
7,535,819 B1 * 5/2009 Larsson ................. H04B 1/713
370/208
(Continued)

FOREIGN PATENT DOCUMENTS

CN 102986282 A 3/2013
EP 1592178 A2 11/2005
(Continued)

OTHER PUBLICATIONS

Catt: "UL ACK/NACK Transmission Design in FDD with CA", 3GPP Draft; R1-100876, 3rd Generation Partnership Project (3GPP), Mobile Competence Centre ; 650, Route Des Lucioles ; F-06921 Sophia-Antipolis Cedex ; France, vol. RAN WG1, No. San Francisco, USA; 20100222, Feb. 16, 2010 (Feb. 16, 2010), XP050418480, [retrieved on Feb. 16, 2010].
(Continued)

*Primary Examiner* — Chi H Pham
*Assistant Examiner* — Robert Lopata
(74) *Attorney, Agent, or Firm* — Knobbe Martens Olson & Bear LLP

(57) ABSTRACT

Systems, methods, and devices for high-efficiency wireless frequency division multiplexing are provided. A method includes receiving, at a first wireless device, a reference signal from an associated access point, the reference signal indicative of a time of joint transmission with at least a second wireless device. The method further includes transmitting a first communication to the access point based on
(Continued)

the reference signal, the communication utilizing a first subset of wireless frequencies available for use. The first communication is concurrent with a second communication, from the second wireless device, utilizing a second subset of wireless frequencies, the second subset excluding the first subset.

70 Claims, 19 Drawing Sheets

(51) Int. Cl.
    *H04J 1/02*     (2006.01)
    *H04W 52/02*     (2009.01)
    *H04J 1/14*     (2006.01)
    *H04L 1/18*     (2006.01)
    *H04W 74/02*     (2009.01)
    *H04W 74/08*     (2009.01)
    *H04L 1/16*     (2006.01)
    *H04L 1/00*     (2006.01)
    *H04W 74/00*     (2009.01)

(52) U.S. Cl.
    CPC ............... *H04J 1/14* (2013.01); *H04L 1/18* (2013.01); *H04L 5/0005* (2013.01); *H04L 5/005* (2013.01); *H04L 5/0037* (2013.01); *H04L 5/0055* (2013.01); *H04L 5/0094* (2013.01); *H04W 52/0212* (2013.01); *H04W 52/0219* (2013.01); *H04W 74/02* (2013.01); *H04L 1/1685* (2013.01); *H04L 1/1861* (2013.01); *H04L 5/006* (2013.01); *H04L 5/0007* (2013.01); *H04L 5/0012* (2013.01); *H04L 5/0069* (2013.01); *H04L 2001/0093* (2013.01); *H04W 74/002* (2013.01); *H04W 74/0816* (2013.01); *Y02B 60/50* (2013.01)

(58) Field of Classification Search
    CPC ..... H04L 5/0037; H04L 5/005; H04L 5/0055; H04L 5/006; H04L 5/0069; H04L 5/0073; H04W 52/0212; H04W 52/0219; H04W 74/0816
    USPC ........................................................ 370/311
    See application file for complete search history.

(56) References Cited

U.S. PATENT DOCUMENTS

| | | | |
|---|---|---|---|
| 7,796,632 B2 | 9/2010 | Hasty et al. | |
| 8,462,817 B2 | 6/2013 | Ketchum et al. | |
| 8,560,009 B2 | 10/2013 | Etemad | |
| 8,600,336 B2 | 12/2013 | Meylan et al. | |
| 9,363,048 B2 | 6/2016 | Hart | |
| 2002/0068547 A1* | 6/2002 | Kim | H04J 13/16 455/410 |
| 2004/0165548 A1 | 8/2004 | Backes | |
| 2004/0203474 A1* | 10/2004 | Miller | H04L 1/0001 455/69 |
| 2005/0002364 A1 | 1/2005 | Ozer et al. | |
| 2005/0094741 A1 | 5/2005 | Kuroda | |
| 2005/0138199 A1 | 6/2005 | Li et al. | |
| 2006/0187874 A1* | 8/2006 | Zaki | H04L 1/0028 370/328 |
| 2006/0248429 A1 | 11/2006 | Grandhi et al. | |
| 2007/0147423 A1 | 6/2007 | Wentink | |
| 2007/0264941 A1 | 11/2007 | Trainin | |
| 2008/0075036 A1* | 3/2008 | Bertrand | H04W 74/04 370/328 |
| 2008/0144732 A1 | 6/2008 | Maltsev et al. | |
| 2008/0232301 A1 | 9/2008 | Cai et al. | |
| 2008/0280621 A1 | 11/2008 | Soomro et al. | |
| 2009/0252110 A1 | 10/2009 | Sridhara et al. | |
| 2009/0310692 A1* | 12/2009 | Kafle | H04L 5/0007 375/260 |
| 2010/0027490 A1* | 2/2010 | Mazet | H04W 74/0816 370/329 |
| 2010/0080173 A1 | 4/2010 | Takagi | |
| 2010/0173637 A1 | 7/2010 | Damnjanovic et al. | |
| 2010/0329195 A1* | 12/2010 | Abraham | H04W 52/42 370/329 |
| 2011/0103280 A1 | 5/2011 | Liu et al. | |
| 2011/0128928 A1* | 6/2011 | Lin | H04W 74/0833 370/329 |
| 2011/0128947 A1 | 6/2011 | Liu et al. | |
| 2011/0249577 A1* | 10/2011 | Chin | H04W 56/0005 370/252 |
| 2011/0305156 A1 | 12/2011 | Liu et al. | |
| 2012/0026997 A1 | 2/2012 | Seok et al. | |
| 2012/0134324 A1 | 5/2012 | Chu et al. | |
| 2012/0263090 A1 | 10/2012 | Porat et al. | |
| 2012/0327870 A1* | 12/2012 | Grandhi | H04W 28/06 370/329 |
| 2013/0121315 A1* | 5/2013 | Langereis | H04W 56/0045 370/336 |
| 2013/0136013 A1* | 5/2013 | Kneckt | H04W 72/082 370/252 |
| 2013/0142179 A1* | 6/2013 | Jung | H04L 5/0037 370/336 |
| 2013/0229996 A1 | 9/2013 | Wang et al. | |
| 2013/0272156 A1* | 10/2013 | Webb | H04L 69/18 370/252 |
| 2013/0286959 A1* | 10/2013 | Lou | H04W 72/04 370/329 |
| 2013/0294431 A1* | 11/2013 | Wang | H04W 28/06 370/338 |
| 2014/0079016 A1* | 3/2014 | Dai | H04L 5/0041 370/330 |
| 2014/0146722 A1* | 5/2014 | Azizi | H04L 69/22 370/311 |
| 2014/0153553 A1* | 6/2014 | Webb | H04W 72/0446 370/336 |
| 2014/0169233 A1 | 6/2014 | Aggarwal et al. | |
| 2014/0241230 A1* | 8/2014 | Coombs | H04L 12/1868 370/312 |
| 2014/0269544 A1* | 9/2014 | Zhu | H04L 1/00 370/329 |
| 2014/0328235 A1 | 11/2014 | Merlin et al. | |
| 2014/0328313 A1 | 11/2014 | Merlin et al. | |
| 2014/0369303 A1 | 12/2014 | Gong et al. | |
| 2015/0146654 A1* | 5/2015 | Chu | H04W 72/1289 370/329 |
| 2015/0382342 A1 | 12/2015 | Seok | |

FOREIGN PATENT DOCUMENTS

| | | |
|---|---|---|
| EP | 2384078 A1 | 11/2011 |
| TW | I378687 B | 12/2012 |
| TW | I379510 B | 12/2012 |
| WO | WO-2005039119 A1 | 4/2005 |
| WO | WO-2007033263 | 3/2007 |
| WO | WO-2008060921 A1 | 5/2008 |
| WO | WO-2010111408 A1 | 9/2010 |
| WO | WO-2011050854 A1 | 5/2011 |
| WO | WO-2011087417 A1 | 7/2011 |

OTHER PUBLICATIONS

IEEE 802.11 "Part 11: Wireless LAN Medium Access Control (MAC) and Physical Layer (PHY) Specifications", Mar. 2012, pp. 1-2793.
International Search Report and Written Opinion—PCT/US2014/036190—ISA/EPO—Aug. 13, 2014.
Li M., et al., "A dynamic channel assignment method based on location information of mobile terminals in indoor WLAN positioning systems", Indoor Positioning and Indoor Navigation (IPIN), 2012 International Conference on, IEEE, Nov. 13, 2012 (Nov. 13, 2012), pp. 1-9, XP032313189, DOI: 10.1109/IPIN.2012.6418883 ISBN: 978-1-4673-1955-3 the whole document.

(56) References Cited

OTHER PUBLICATIONS

Zhou S., et al., "Distributed Medium Access Control with SDMA Support for WLANs," IEICE Transactions on Communications, Communications Society, Tokyo, JP, vol. E93B (4), 2010, pp. 961-970.
Taiwan Search Report—TW103115858—TIPO—Mar. 11, 2016.

* cited by examiner

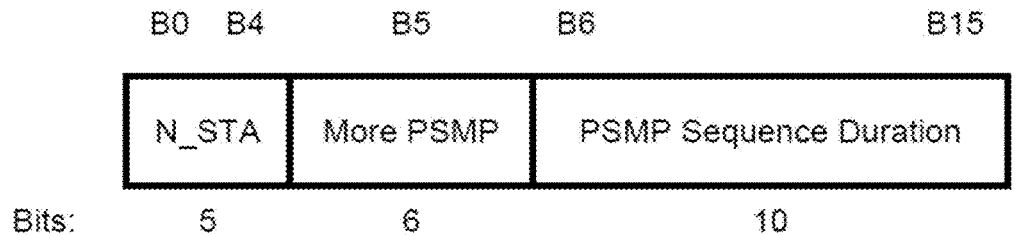
PSMP Parameter Set fixed field
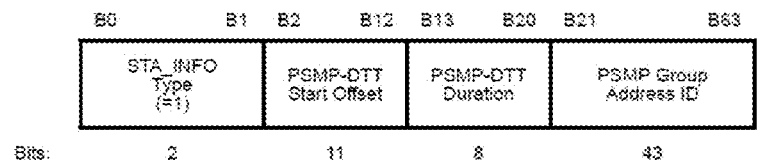
PSMP STA Info fixed field (group addressed)
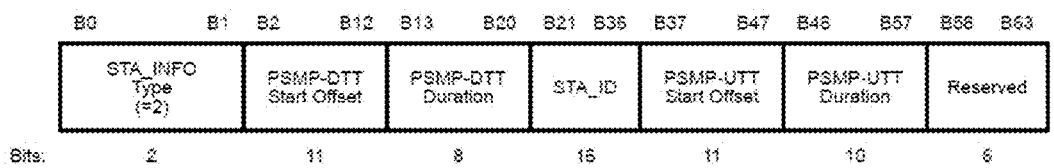
PSMP STA Info fixed field (individually addressed)
PSMP frame Action field format
| Order | Information |
|---|---|
| 1 | Category |
| 2 | HT Action |
| 3 | PSMP Parameter Set    (PSMP Parameter Set field)) |
| 4 to (N_STA+3) | PSMP STA Info    (PSMP STA Info field))<br>Repeated N_STA times (N_STA is a subfield of the PSMP Parameter Set field) |
FIG. 7B

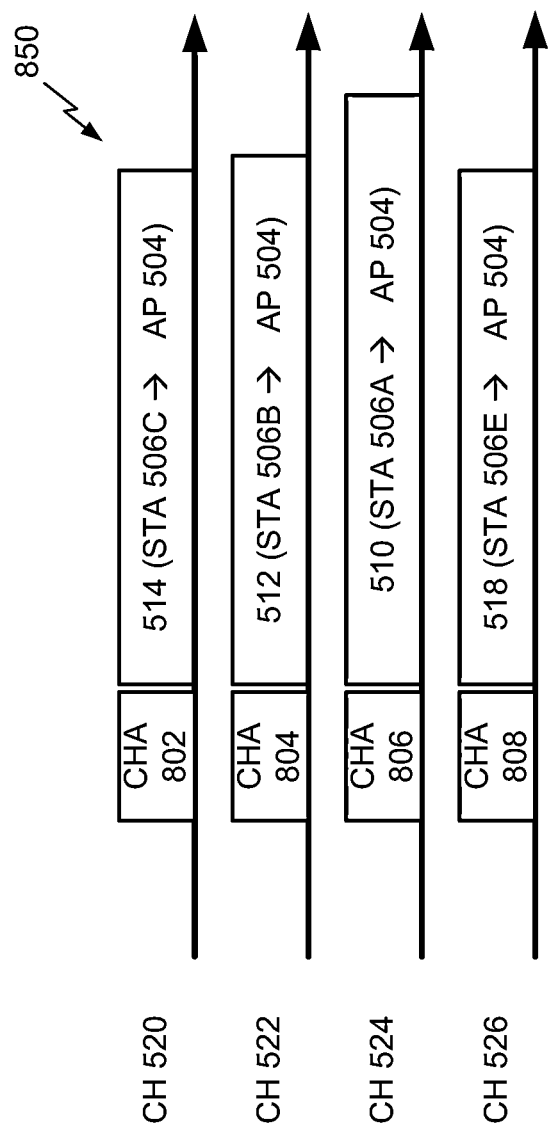

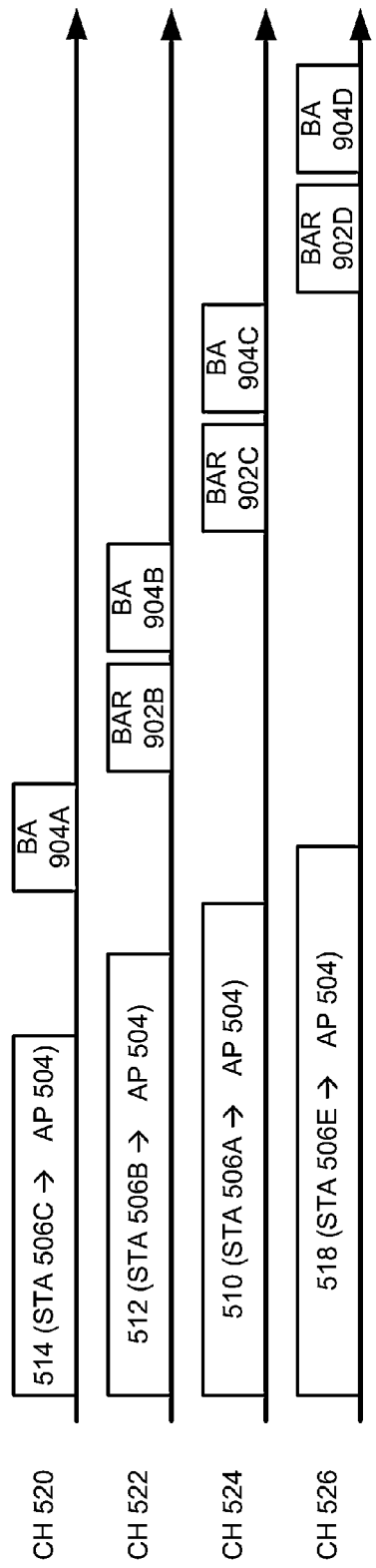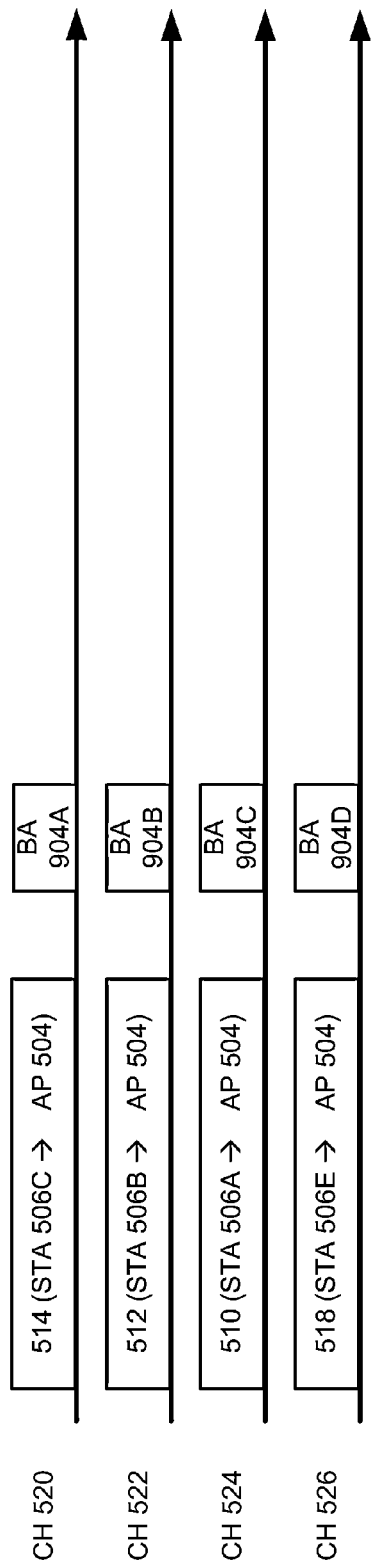
FIG. 9A
FIG. 9B

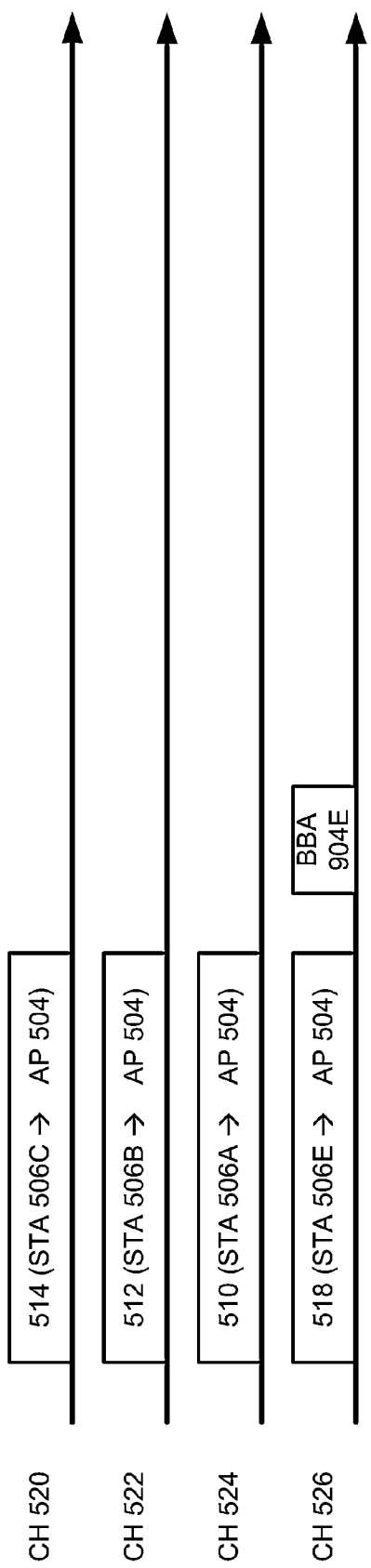

METHODS AND SYSTEMS FOR FREQUENCY MULTIPLEXED COMMUNICATION IN DENSE WIRELESS ENVIRONMENTS

CROSS-REFERENCE TO RELATED APPLICATIONS

This application claims the benefit of U.S. Provisional Application Nos. 61/819,096, filed May 3, 2013 and 61/846,579, filed Jul. 15, 2013, the entire contents of each of which is incorporated herein by reference.

FIELD

The present application relates generally to wireless communications, and more specifically to systems, methods, and devices for frequency multiplexed wireless communication in dense wireless environments.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (for example, circuit switching vs. packet switching), the type of physical media employed for transmission (for example, wired vs. wireless), and the set of communication protocols used (for example, Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

However, multiple wireless networks may exist in the same building, in nearby buildings, and/or in the same outdoor area. The prevalence of multiple wireless networks may cause interference, reduced throughput (for example, because each wireless network is operating in the same area and/or spectrum), and/or prevent certain devices from communicating. Thus, improved systems, methods, and devices for communicating when wireless networks are densely populated are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect of this disclosure provides a method of high-efficiency wireless frequency division multiplexing. The method includes determining, at an access point, a performance characteristic for each wireless device in a set of wireless devices associated with the access point. The method further includes categorizing each wireless device in the set into at least a first and second subset of wireless devices based on the performance characteristic. The method further includes receiving communications from the first subset of wireless devices on a first set of wireless frequencies. The method further includes receiving communications from the second subset of wireless devices on a second set of wireless frequencies, the second set of wireless frequencies being a subset of the first. The first set of wireless devices have a higher performance characteristic than the second set of wireless devices.

Another aspect provides an access point configured to perform high-efficiency wireless frequency division multiplexing. The access point includes a processor configured to determine a performance characteristic for each wireless device in a set of wireless devices associated with the access point. The processor is further configured to categorize each wireless device in the set into at least a first and second subset of wireless devices based on the performance characteristic. The access point further includes a receiver configured to receive communications from the first subset of wireless devices on a first set of wireless frequencies. The receiver is further configured to receive communications from the second subset of wireless devices on a second set of wireless frequencies, the second set of wireless frequencies being a subset of the first. The first set of wireless devices have a higher performance characteristic than the second set of wireless devices.

Another aspect provides an apparatus for high-efficiency wireless frequency division multiplexing. The apparatus includes means for determining, at an access point, a performance characteristic for each wireless device in a set of wireless devices associated with the access point. The apparatus further includes means for categorizing each wireless device in the set into at least a first and second subset of wireless devices based on the performance characteristic. The apparatus further includes means for receiving communications from the first subset of wireless devices on a first set of wireless frequencies. The apparatus further includes means for receiving communications from the second subset of wireless devices on a second set of wireless frequencies, the second set of wireless frequencies being a subset of the first. The first set of wireless devices have a higher performance characteristic than the second set of wireless devices.

Another aspect provides a non-transitory computer-readable medium including code that, when executed, causes an apparatus to determine, at an access point, a performance characteristic for each wireless device in a set of wireless devices associated with the access point. The medium further includes code that, when executed, causes the apparatus to categorize each wireless device in the set into at least a first and second subset of wireless devices based on the performance characteristic. The medium further includes code that, when executed, causes the apparatus to receive communications from the first subset of wireless devices on a first set of wireless frequencies. The medium further includes code that, when executed, causes the apparatus to receive communications from the second subset of wireless devices on a second set of wireless frequencies, the second set of wireless frequencies being a subset of the first. The first set of wireless devices have a higher performance characteristic than the second set of wireless devices.

Another aspect provides a method of high-efficiency wireless frequency division multiplexing. The method includes receiving, at a first wireless device, a reference signal from an associated access point, the reference signal indicative of a time of joint transmission with at least a second wireless device. The method further includes transmitting a first communication to the access point based on the reference signal, the communication utilizing a first subset of wireless frequencies available for use. The first communication is concurrent with a second communication, from the second wireless device, utilizing a second subset of wireless frequencies, the second subset excluding the first subset.

Another aspect provides a first wireless device configured to perform high-efficiency wireless frequency division multiplexing. The device includes a receiver configured to receive a reference signal from an associated access point, the reference signal indicative of a time of joint transmission with at least a second wireless device. The device further includes a transmitter configured to transmit a first communication to the access point based on the reference signal, the communication utilizing a first subset of wireless frequencies available for use. The first communication is concurrent with a second communication, from the second wireless device, utilizing a second subset of wireless frequencies, the second subset excluding the first subset.

Another aspect provides an apparatus for high-efficiency wireless frequency division multiplexing. The apparatus includes means for receiving, at a first wireless device, a reference signal from an associated access point, the reference signal indicative of a time of joint transmission with at least a second wireless device. The apparatus further includes means for transmitting a first communication to the access point based on the reference signal, the communication utilizing a first subset of wireless frequencies available for use. The first communication is concurrent with a second communication, from the second wireless device, utilizing a second subset of wireless frequencies, the second subset excluding the first subset.

Another aspect provides non-transitory computer-readable medium including code that, when executed, causes an apparatus to receive, at a first wireless device, a reference signal from an associated access point, the reference signal indicative of a time of joint transmission with at least a second wireless device. The medium further includes code that, when executed, causes the apparatus to transmit a first communication to the access point based on the reference signal, the communication utilizing a first subset of wireless frequencies available for use. The first communication is concurrent with a second communication, from the second wireless device, utilizing a second subset of wireless frequencies, the second subset excluding the first subset.

Another aspect provides a method of high-efficiency wireless frequency division multiplexing. The method includes exchanging, at an access point, at least one protection frame with at least one of a first and second wireless device. The method further includes receiving a first communication on a first set of wireless frequencies from at least the first wireless device device. The method further includes receiving a second communication, at least partially concurrent with the first communication, on a second set of wireless frequencies from the second wireless device. The method further includes transmitting at least one acknowledgment of the first and second communication. The first set and the second set are mutually exclusive subsets of a set of wireless frequencies available for use by both the first and second wireless device.

Another aspect provides an access point configured to perform high-efficiency wireless frequency division multiplexing. The access point includes a processor configured to exchange at least one protection frame with at least one of a first and second wireless device. The access point further includes a receiving configured to receive a first communication on a first set of wireless frequencies from at least the first wireless device device. The receiver is further configured to receive a second communication, at least partially concurrent with the first communication, on a second set of wireless frequencies from the second wireless device. The access point further includes a transmitter configured to transmit at least one acknowledgment of the first and second communication. The first set and the second set are mutually exclusive subsets of a set of wireless frequencies available for use by both the first and second wireless device.

Another aspect provides an apparatus for high-efficiency wireless frequency division multiplexing. The apparatus includes means for exchanging, at an access point, at least one protection frame with at least one of a first and second wireless device. The apparatus further includes means for receiving a first communication on a first set of wireless frequencies from at least the first wireless device device. The apparatus further includes means for receiving a second communication, at least partially concurrent with the first communication, on a second set of wireless frequencies from the second wireless device. The apparatus further includes means for transmitting at least one acknowledgment of the first and second communication. The first set and the second set are mutually exclusive subsets of a set of wireless frequencies available for use by both the first and second wireless device.

Another aspect provides a non-transitory computer-readable medium including code that, when executed, causes an apparatus to exchange, at an access point, at least one protection frame with at least one of a first and second wireless device. The medium further includes code that, when executed, causes the apparatus to receive a first communication on a first set of wireless frequencies from at least the first wireless device device. The medium further includes code that, when executed, causes the apparatus to receive a second communication, at least partially concurrent with the first communication, on a second set of wireless frequencies from the second wireless device. The medium further includes code that, when executed, causes the apparatus to transmit at least one acknowledgment of the first and second communication. The first set and the second set are mutually exclusive subsets of a set of wireless frequencies available for use by both the first and second wireless device.

BRIEF DESCRIPTION OF THE DRAWINGS

FIG. 7B shows exemplary reference signal formats and fields that can be employed within the wireless communication systems of FIGS. 1, 2B, and 3.

FIG. 8 shows another timing diagram in which aspects of the present disclosure can be employed.

FIGS. 9A-9D show additional timing diagrams in which aspects of the present disclosure can be employed.

DETAILED DESCRIPTION

Figure 1:
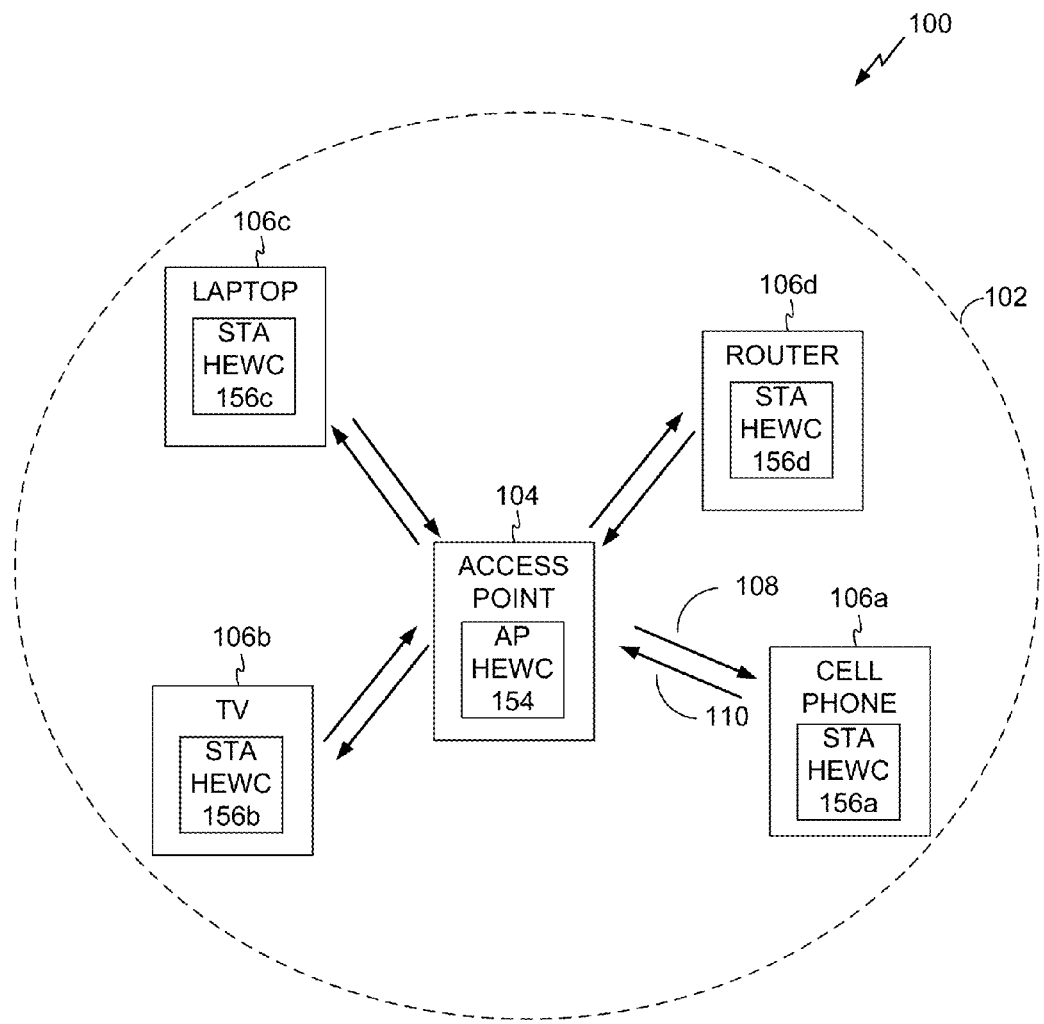
FIG. 1 shows an exemplary wireless communication system in which aspects of the present disclosure can be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN can be used to interconnect nearby devices together, employing widely used networking protocols. The various aspects described herein may apply to any communication standard, such as a wireless protocol.

In some aspects, wireless signals can be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol can be used for Internet access, sensors, metering, smart grid networks, or other wireless applications. Advantageously, aspects of certain devices implementing the high-efficiency 802.11 protocol using the techniques disclosed herein may include allowing for increased peer-to-peer services (for example, Miracast, WiFi Direct Services, Social WiFi, etc.) in the same area, supporting increased per-user minimum throughput requirements, supporting more users, providing improved outdoor coverage and robustness, and/or consuming less power than devices implementing other wireless protocols.

In some implementations, a WLAN includes various devices which are the components that access the wireless network. For example, there can be two types of devices: access points ("APs") and clients (also referred to as stations, or "STAs"). In general, an AP may serve as a hub or base station for the WLAN and an STA serves as a user of the WLAN. For example, an STA can be a laptop computer, a personal digital assistant (PDA), a mobile phone, etc. In an example, an STA connects to an AP via a WiFi (for example, IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (for example, a cellular phone or smartphone), a computer (for example, a laptop), a portable communication device, a headset, a portable computing device (for example, a personal data assistant), an entertainment device (for example, a music or video device, or a satellite radio), a gaming device or system, a global positioning system device, or any other suitable device that is configured to communicate via a wireless medium.

As discussed above, certain of the devices described herein may implement a high-efficiency 802.11 standard, for example. Such devices, whether used as an STA or AP or other device, can be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (for example, for use with hotspots), or to implement machine-to-machine communications.

FIG. 1 shows an exemplary wireless communication system 100 in which aspects of the present disclosure can be employed. The wireless communication system 100 may operate pursuant to a wireless standard, for example a high-efficiency 802.11 standard. The wireless communication system 100 may include an AP 104, which communicates with STAs 106.

A variety of processes and methods can be used for transmissions in the wireless communication system 100 between the AP 104 and the STAs 106. For example, signals can be sent and received between the AP 104 and the STAs 106 in accordance with OFDM/OFDMA techniques. If this is the case, the wireless communication system 100 can be referred to as an OFDM/OFDMA system. Alternatively, signals can be sent and received between the AP 104 and the STAs 106 in accordance with code division multiple access (CDMA) techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

In some aspects, a STA 106 can be required to associate with the AP 104 in order to send communications to and/or receive communications from the AP 104. In one aspect, information for associating is included in a broadcast by the AP 104. To receive such a broadcast, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

In an embodiment, the AP 104 includes an AP high-efficiency wireless component (HEWC) 154. The AP HEWC 154 may perform some or all of the operations described herein to enable communications between the AP 104 and the STAs 106 using the high-efficiency 802.11 protocol. The functionality of some implementations of the AP HEWC 154 is described in greater detail below with respect to FIGS. 2B, 3, 4, and 8.

Alternatively or in addition, the STAs 106 may include a STA HEWC 156. The STA HEWC 156 may perform some or all of the operations described herein to enable communications between the STAs 106 and the AP 104 using the high-frequency 802.11 protocol. The functionality of some implementations of the STA HEWC 156 is described in greater detail below with respect to FIGS. 2B, 3, 4, 8B, and 10B.

Figure 2A:
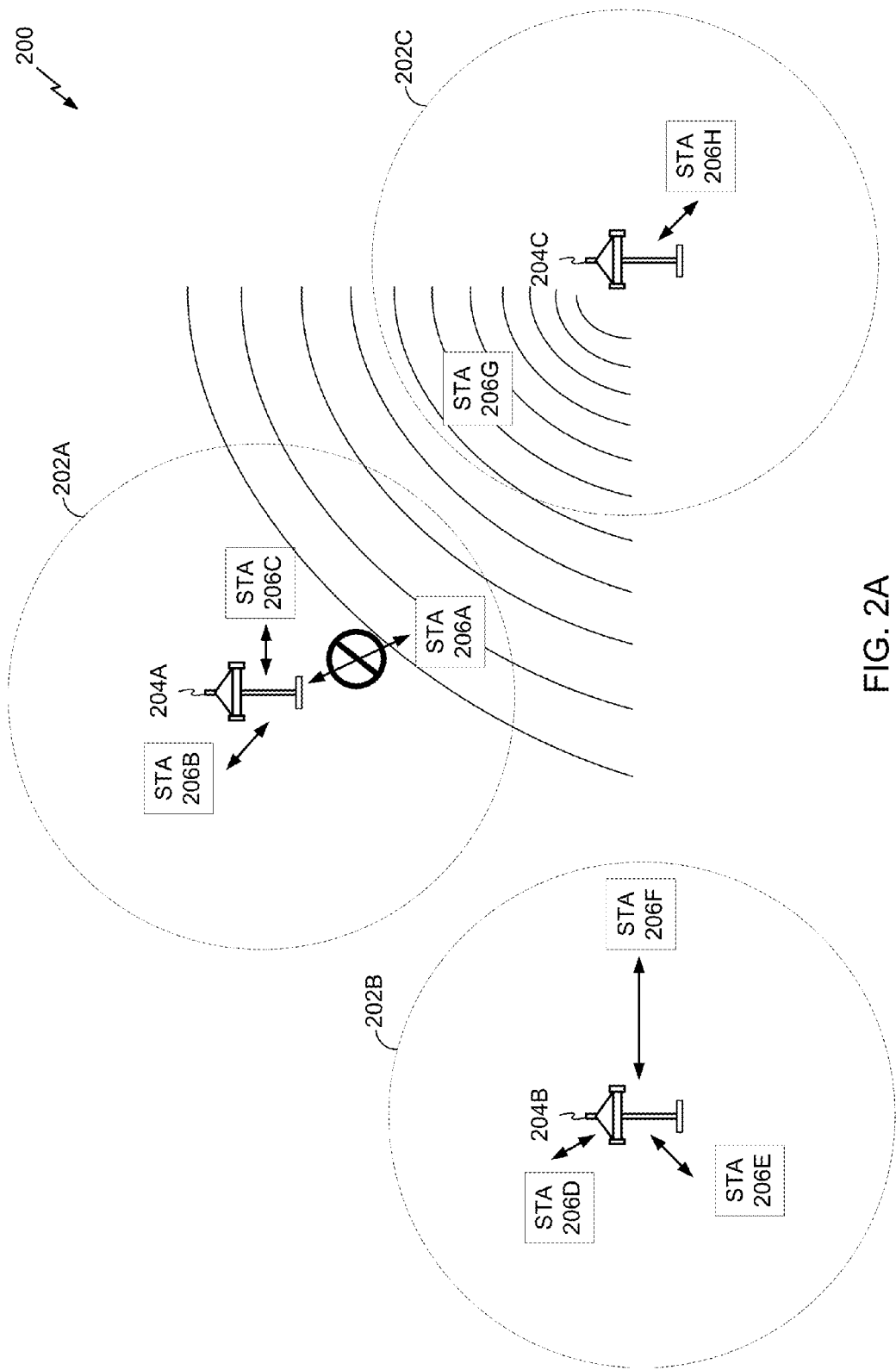
FIG. 2A shows a wireless communication system in which multiple wireless communication networks are present.

In some circumstances, a BSA can be located near other BSAs. For example, FIG. 2A shows a wireless communication system 200 in which multiple wireless communication networks are present. As illustrated in FIG. 2A, BSAs 202A, 202B, and 202C can be physically located near each other. Despite the close proximity of the BSAs 202A-202C, the APs 204A-204C and/or STAs 206A-206H may each communicate using the same spectrum. Thus, if a device in the BSA 202C (for example, the AP 204C) is transmitting data, devices outside the BSA 202C (for example, APs 204A-204B or STAs 206A-206F) may sense the communication on the medium.

Generally, wireless networks that use a regular 802.11 protocol (for example, 802.11a, 802.11b, 802.11g, 802.11n, etc.) operate under a carrier sense multiple access (CSMA) mechanism for medium access. According to CSMA, devices sense the medium and only transmit when the medium is sensed to be idle. Thus, if the APs 204A-204C and/or STAs 206A-206H are operating according to the CSMA mechanism and a device in the BSA 202C (for example, the AP 204C) is transmitting data, then the APs 204A-204B and/or STAs 206A-206F outside of the BSA 202C may not transmit over the medium even though they are part of a different BSA.

FIG. 2A illustrates such a situation. As illustrated in FIG. 2A, AP 204C is transmitting over the medium. The transmission is sensed by STA 206G, which is in the same BSA 202C as the AP 204C, and by STA 206A, which is in a different BSA than the AP 204C. While the transmission can be addressed to the STA 206G and/or only STAs in the BSA 202C, STA 206A nonetheless may not be able to transmit or receive communications (for example, to or from the AP 204A) until the AP 204C (and any other device) is no longer transmitting on the medium. Although not shown, the same may apply to STAs 206D-206F in the BSA 202B and/or STAs 206B-206C in the BSA 202A as well (for example, if the transmission by the AP 204C is stronger such that the other STAs can sense the transmission on the medium).

The use of the CSMA mechanism then creates inefficiencies because some APs or STAs outside of a BSA can be able to transmit data without interfering with a transmission made by an AP or STA in the BSA. As the number of active wireless devices continues to grow, the inefficiencies can begin to significantly affect network latency and throughput. For example, significant network latency issues may appear in apartment buildings, in which each apartment unit may include an access point and associated stations. In fact, each apartment unit may include multiple access points, as a resident may own a wireless router, a video game console with wireless media center capabilities, a television with wireless media center capabilities, a cell phone that can act like a personal hot-spot, and/or the like. Correcting the inefficiencies of the CSMA mechanism may then be vital to avoid latency and throughput issues and overall user dissatisfaction.

Such latency and throughput issues may not be confined to residential areas. For example, multiple access points can be located in airports, subway stations, and/or other densely-populated public spaces. Currently, WiFi access can be offered in these public spaces, but for a fee. If the inefficiencies created by the CSMA mechanism are not corrected, then operators of the wireless networks may lose customers as the fees and lower quality of service begin to outweigh any benefits.

Accordingly, the high-efficiency 802.11 protocol described herein may allow for devices to operate under a modified mechanism that minimizes these inefficiencies and increases network throughput. Such a mechanism is described below with respect to FIGS. 2B, 3, and 4. Additional aspects of the high-efficiency 802.11 protocol are described below with respect to FIGS. 5-13.

Figure 2B:
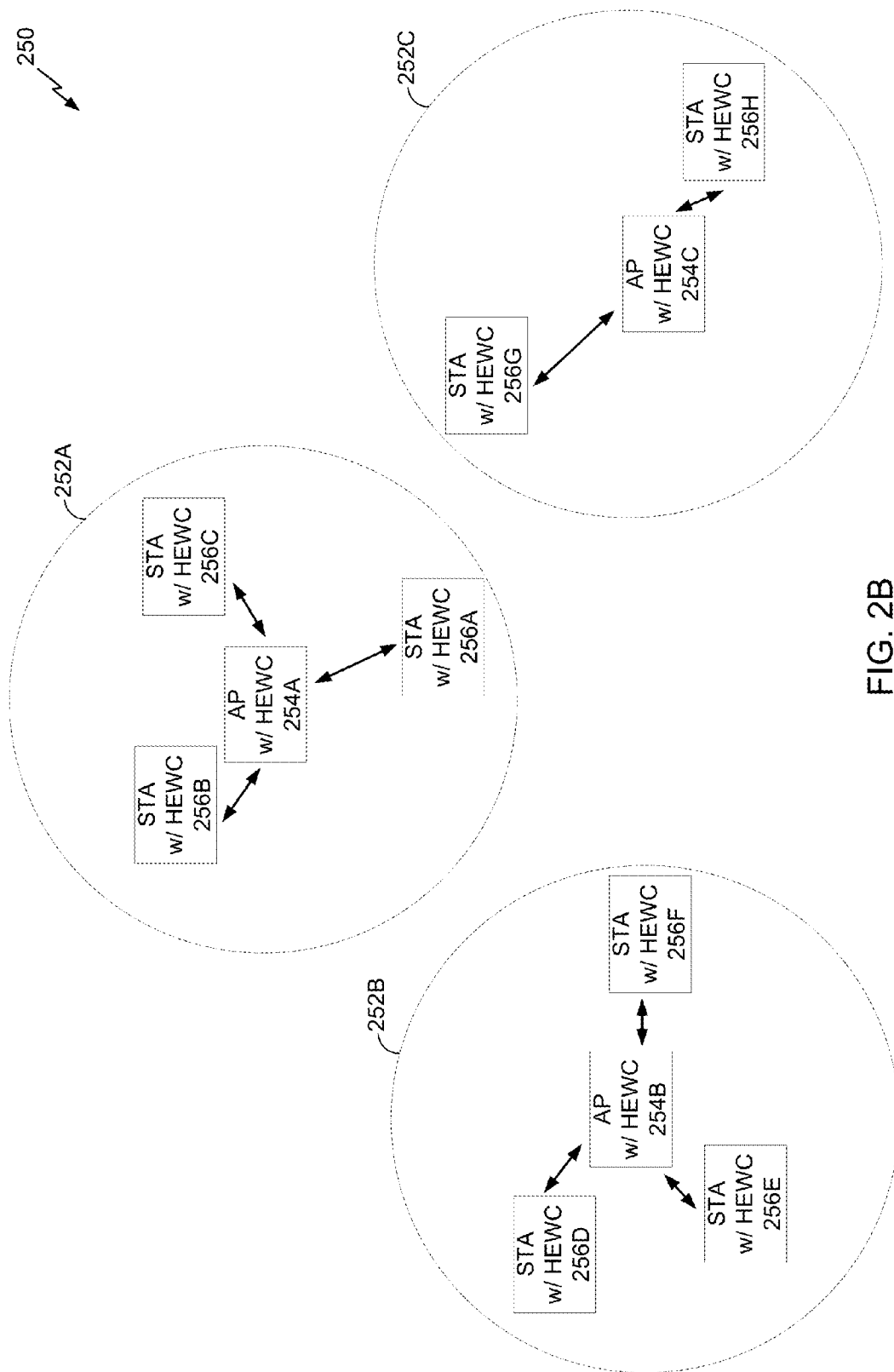
FIG. 2B shows another wireless communication system in which multiple wireless communication networks are present.

FIG. 2B shows a wireless communication system 250 in which multiple wireless communication networks are present. Unlike the wireless communication system 200 of FIG. 2A, the wireless communication system 250 may operate pursuant to the high-efficiency 802.11 standard discussed herein. The wireless communication system 250 may include an AP 254A, an AP 254B, and an AP 254C. The AP 254A may communicate with STAs 256A-256C, the AP 254B may communicate with STAs 256D-256F, and the AP 254C may communicate with STAs 256G-256H.

A variety of processes and methods can be used for transmissions in the wireless communication system 250 between the APs 254A-254C and the STAs 256A-256H. For example, signals can be sent and received between the APs 254A-254C and the STAs 256A-256H in accordance with OFDM/OFDMA techniques or CDMA techniques.

The AP 254A may act as a base station and provide wireless communication coverage in a BSA 252A. The AP 254B may act as a base station and provide wireless communication coverage in a BSA 252B. The AP 254C may act as a base station and provide wireless communication coverage in a BSA 252C. It should be noted that each BSA 252A, 252B, and/or 252C may not have a central AP 254A, 254B, or 254C, but rather may allow for peer-to-peer communications between one or more of the STAs 256A-256H. Accordingly, the functions of the AP 254A-254C described herein may alternatively be performed by one or more of the STAs 256A-256H.

In an embodiment, the APs 254A-254C and/or STAs 256A-256H include a high-efficiency wireless component. As described herein, the high-efficiency wireless component may enable communications between the APs and STAs using the high-efficiency 802.11 protocol. In particular, the high-efficiency wireless component may enable the APs 254A-254C and/or STAs 256A-256H to use a modified mechanism that minimizes the inefficiencies of the CSMA mechanism (for example, enables concurrent communications over the medium in situations in which interference would not occur). The high-efficiency wireless component is described in greater detail below with respect to FIG. 4.

As illustrated in FIG. 2B, the BSAs 252A-252C are physically located near each other. When, for example, AP 254A and STA 256B are communicating with each other, the communication can be sensed by other devices in BSAs 252B-252C. However, the communication may only interfere with certain devices, such as STA 256F and/or STA 256G. Under CSMA, AP 254B would not be allowed to communicate with STA 256E even though such communication would not interfere with the communication between AP 254A and STA 256B. Thus, the high-efficiency 802.11 protocol operates under a modified mechanism that differentiates between devices that can communicate concurrently and devices that cannot communicate concurrently. In various embodiments used herein, "concurrently" can mean at least partially overlapping in time. Such classification of devices can be performed by the high-efficiency wireless component in the APs 254A-254C and/or the STAs 256A-256H.

In an embodiment, the determination of whether a device can communicate concurrently with other devices is based on a "location" of the device. For example, a STA that is located near an "edge" of the BSA can be in a state or condition such that the STA cannot communicate concurrently with other devices. As illustrated in FIG. 2B, STAs 206A, 206F, and 206G can be devices that are in a state or condition in which they cannot communicate concurrently with other devices. Likewise, a STA that is located near the center of the BSA can be in a station or condition such that the STA can communicate concurrently with other devices. As illustrated in FIG. 2B, STAs 206B, 206C, 206D, 206E, and 206H can be devices that are in a state or condition in which they can communicate concurrently with other devices. Note that the classification of devices is not permanent. Devices may transition between being in a state or condition such that they can communicate concurrently and being in a state or condition such that they cannot communicate concurrently (for example, devices may change states or conditions when in motion, when associating with a new AP, when disassociating, etc.).

As used herein, a device can be classified as an "edge" device based on a physical location, a radio "location" (for example, a radio frequency characteristic), or a combination thereof. For example, in the illustrated embodiment, the STA 256B can be physically close to the AP 254A. Accordingly, the STA 256B can be classified as an inner-cell device (i.e., not an "edge" device) based on its physical proximity to the AP 254A. Particularly, the STA 256B can be likely to successfully communicate with the AP 254A, even while the STA 256G is concurrently transmitting.

On the other hand, the STA 256C can be physically close to the AP 254A, but its antenna might be oriented poorly for communication with the AP 254A. For example, it's the STA 256C could have a directional antenna pointed at the STA 256G. Accordingly, although the STA 256C might be physically close to the AP 254A, it can be classified as an edge device due to poor RF characteristics with respect to the AP 254A. In other words, the STA 256C might be unlikely to successfully communicate with the AP 254A while the STA 256G is concurrently transmitting.

In another example, the STA 256A might be physically close to the AP 254A, but it might also be physically close to the STA 256G. Due to the proximity between the STA 256A and the STA 256G, the STA 256A might be unlikely to successfully communicate with the AP 254A while the STA 256G is concurrently transmitting. In this embodiment, the STA 256A might also be characterized as an edge device.

In various embodiments, RF characteristics that affect the characterization of a STA as an inner-cell device or a cell-edge device can include one or more of: a signal-to-interference-plus-noise ratio (SINR), an RF geometry, a received signal strength indicator (RSSI), a modulation and coding scheme (MCS) value, an interference level, a signal level, etc. In various embodiments, one or more physical and RF characteristics can be compared to one or more threshold levels. The comparisons can be weighted and/or combined.

In various embodiments, devices can be determined to be in a condition such that they can or cannot communicate concurrently based on the solitary, weighted, and/or combined physical and RF characteristics and associated thresholds.

Devices can be configured to behave differently based on whether they are ones that are or are not in a state or condition to communicate concurrently with other devices. For example, devices that are in a state or condition such that they can communicate concurrently (which can be referred to herein as "inner cell" devices) may communicate within the same spectrum. However, devices that are in a state or condition such that they cannot communicate concurrently (which can be referred to herein as "cell-edge" devices) may employ certain techniques, such as spatial multiplexing or frequency domain multiplexing, in order to communicate over the medium. The controlling of the behavior of the devices can be performed by the high-efficiency wireless component in the APs 254A-254C and/or the STAs 256A-256H.

In an embodiment, cell-edge devices use spatial multiplexing techniques to communicate over the medium. For example, power and/or other information can be embedded within the preamble of a packet transmitted by another device. A device in a state or condition such that the device cannot communicate concurrently may analyze the preamble when the packet is sensed on the medium and decide whether or not to transmit based on a set of rules.

In another embodiment, cell-edge devices use frequency domain multiplexing techniques to communicate over the medium. For example, in one embodiment, a first subset of cell-edge devices can communicate using a first subset of available bandwidth. A second subset of cell-edge devices can communicate using a second subset of available bandwidth. Meanwhile, inner cell devices can communicate using an entirety of available bandwidth, or a third subset of available bandwidth. In various embodiments, the third subset can be larger than the first and/or second subsets. In some embodiments, the third subset can intersect with the first and/or second subsets. In some embodiments, the third subset can include all available bandwidth (for example, all bandwidth licensed for use according to a specific technology such as 802.11). Although channels, sub-channels, available bandwidth, and subsets thereof, are generally depicted herein as contiguous, a person having ordinary skill in the art will appreciate that the terms used herein can also encompass contiguous frequencies, interleaved frequencies, sets of adjacent or non-adjacent tones with or without frequency hopping, etc.

For example, with continuing reference to FIG. 2B, STAs 256A, 256C, and 256G can be cell-edge devices, while STAs 256B and 256H can be inner-cell devices. Accordingly, in an embodiment, the STAs 256A and 256C may form a first subset of cell-edge devices configured to communicate with the AP 254A on a first sub-channel (or set of sub-channels). The first subset of cell-edge devices can be associated with a first BSA 252A. The STA 256G may form a second subset of cell-edge devices configured to communicate with the AP 254C on a second sub-channel (or set of sub-channels), which can be orthogonal to the first sub-channel. The second subset of cell-edge devices can be associated with a second BSA 252C. Thus, in an embodiment, the STA 256A can communicate at the same time (but on a different sub-channel) as the STA 256G.

Meanwhile, the STA 256B may communicate with the AP 254A using a third sub-channel and the STA 256H can communicate with the AP 254C using the third sub-channel.

Thus, the STA 256B can communicate at the same time (and on at least some overlapping channels) as the STA 256H. Because the STAs 256B and 256H are inner-cell devices, they are unlikely to interfere with each other. In various embodiments, the STAs 256B and 256H can also communicate on different overlapping or non-overlapping sub-channels.

In some embodiments, one or more devices in each BSA can coordinate frequency use and re-use so as to reduce or minimize the chances of interference. For example, one or more devices in the first BSA 252A can transmit an instruction to one or more devices in the first and/or second BSAs 252A and/or 252C, identifying sub-channels for use by cell-edge devices in one or both BSAs 252A and 252C. For example, the AP 254A can instruct the STA 256A to use a specific sub-channel, and can subsequently instruct the STA 256A to use another sub-channel. Likewise, the AP 254A can instruct the STA 256G to use a specific sub-channel, and can subsequently instruct the STA 256G to use another sub-channel.

In another embodiment, cell-edge devices in the first BSA 252A can simply start using a first sub-channel (or set of sub-channels). For example, the cell-edge devices in the first BSA 252A can choose a first sub-channel based on one or more RF characteristics such as the sub-channel or set of sub-channels with the least interference. The cell-edge devices in the second BSA 252C can observe the use of the first sub-channel and can choose a second sub-channel (or set of sub-channels). For example, new interference on the first sub-channel may cause the cell-edge devices in the second BSA 252C to choose the second sub-channel.

In some embodiments, frequency use and re-use can be uncoordinated. For example, the cell-edge devices can be configured to hop between sub-channels on a scheduled, random, or pseudo-random basis. Thus, the STA 256A can use a specific sub-channel for a first period of time, and can subsequently use another sub-channel. Likewise, the STA 256G can use a specific sub-channel for a first period of time, and can subsequently use another sub-channel. In some circumstances, the STAs 256A and 256G might hop to the same sub-channel by chance. However, they are also likely to occasionally transmit on different channels.

Figure 3:
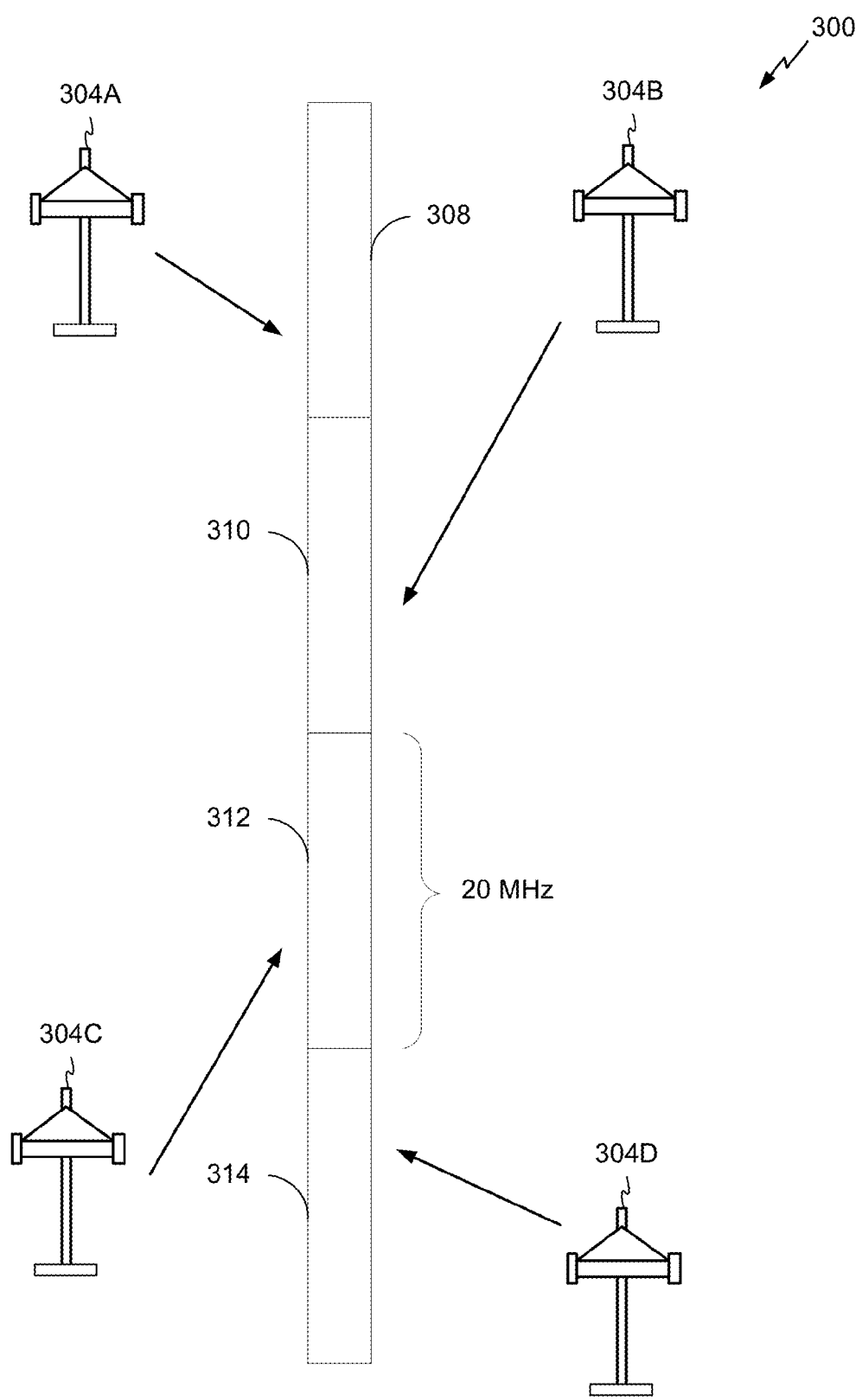
FIG. 3 shows frequency multiplexing techniques that can be employed within the wireless communication systems of FIGS. 1 and 2B.

FIG. 3 shows frequency multiplexing techniques that can be employed within the wireless communication systems 100 of FIG. 1 and 250 of FIG. 2B. As illustrated in FIG. 3, an AP 304A, 304B, 304C, and 304D can be present within a wireless communication system 300. Each of the APs 304A, 304B, 304C, and 304D can be associated with a different BSA and include the high-efficiency wireless component described herein.

As an example, an available bandwidth of the communication medium can be set by a licensing body, a standards body, or preset or detected by a device. For example, in an 802.11 standard, an available bandwidth can be 80 MHz. Under a legacy 802.11 protocol, each of the APs 304A, 304B, 304C, and 304D and the STAs associated with each respective AP attempt to communicate using the entire bandwidth, which can reduce throughput. In some instances, each respective AP may reserve the entire bandwidth while actually communicating only on a subset of available bandwidth. For example, a legacy channel can have a 20 MHz bandwidth. However, under the high-efficiency 802.11 protocol using frequency domain multiplexing, the bandwidth can be divided into a plurality of sub-channels. In the illustrated embodiment of FIG. 3, for example, the 80 MHz available bandwidth is divided into four 20 MHz segments 308, 310, 312, and 314 (for example, channels). The AP 304A can be associated with segment 308, the AP 304B can be associated with segment 310, the AP 304C can be associated with segment 312, and the AP 304D can be associated with segment 314. In various embodiments, other size sub-channels can be used. For example, sub-channels can be between about 1 MHz and 40 MHZ, between about 2 MHz and 10 MHz, and more particularly about 5 MHz. As discussed above, sub-channels can be contiguous or non-contiguous (for example, interleaved).

In an embodiment, when the APs 304A-304D and the STAs that are in a state or condition such that the STAs can communicate concurrently with other devices (for example, STAs near the center of the BSA) are communicating with each other, then each AP 304A-304D and each of these STAs may communicate using a portion of or the entire 80 MHz medium. However, when the APs 304A-304D and the STAs that are in a state or condition such that the STAs cannot communicate concurrently with other devices (for example, STAs near the edge of the BSA) are communicating with each other, then AP 304A and its STAs communicate using 20 MHz segment 308, AP 304B and its STAs communicate using 20 MHz segment 310, AP 304C and its STAs communicate using 20 MHz segment 312, and AP 304D and its STAs communicate using 20 MHz segment 314. Because the segments 308, 310, 312, and 314 are different portions of the communication medium, a first transmission using a first segment would not interference with a second transmission using a second segment.

Thus, APs and/or STAs, even those that are in a state or condition such that they cannot communicate concurrently with other devices, that include the high-efficiency wireless component, can communicate concurrently with other APs and STAs without interference. Accordingly, the throughput of the wireless communication system 300 can be increased. In the case of apartment buildings or densely-populated public spaces, APs and/or STAs that use the high-efficiency wireless component may experience reduced latency and increased network throughput even as the number of active wireless devices increases, thereby improving user experience.

Figure 4:
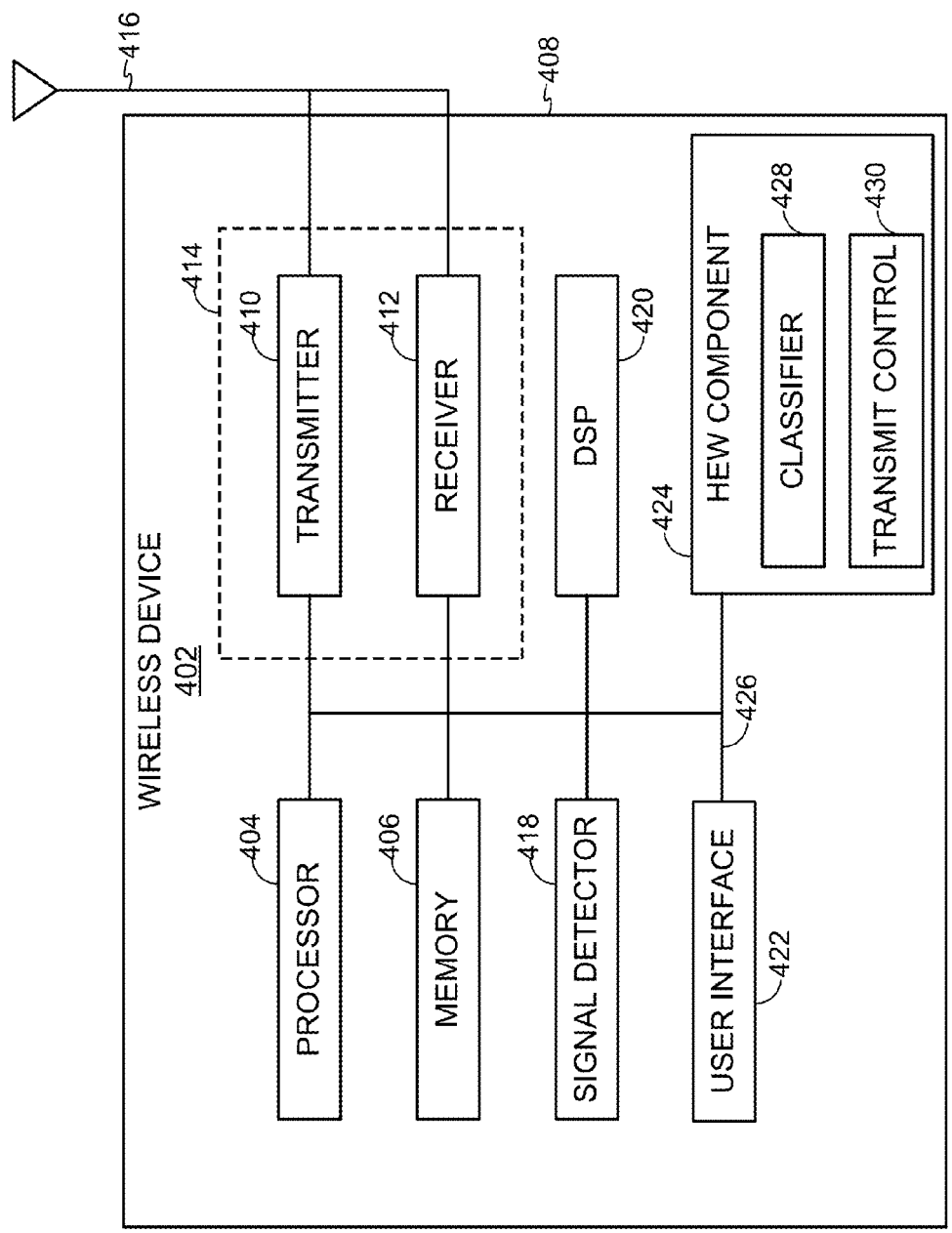
FIG. 4 shows a functional block diagram of an exemplary wireless device that can be employed within the wireless communication systems of FIGS. 1, 2B, and 3.

FIG. 4 shows an exemplary functional block diagram of a wireless device 402 that can be employed within the wireless communication systems 100, 250, and/or 300 of FIGS. 1, 2B, and 3. The wireless device 402 is an example of a device that can be configured to implement the various methods described herein. For example, the wireless device 402 may comprise the AP 104, one of the STAs 106, one of the APs 254, one of the STAs 256, and/or one of the APs 304.

The wireless device 402 may include a processor 404 which controls operation of the wireless device 402. The processor 404 may also be referred to as a central processing unit (CPU). Memory 406, which may include both read-only memory (ROM) and random access memory (RAM), may provide instructions and data to the processor 404. A portion of the memory 406 may also include non-volatile random access memory (NVRAM). The processor 404 typically performs logical and arithmetic operations based on program instructions stored within the memory 406. The instructions in the memory 406 can be executable to implement the methods described herein.

The processor 404 may comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (for example, in source code format, binary code format, executable code format, or any other suitable format of code). The instructions, when executed by the one or more processors, cause the processing system to perform the various functions described herein.

The wireless device 402 may also include a housing 408 that may include a transmitter 410 and/or a receiver 412 to allow transmission and reception of data between the wireless device 402 and a remote location. The transmitter 410 and receiver 412 can be combined into a transceiver 414. An antenna 416 can be attached to the housing 408 and electrically coupled to the transceiver 414. The wireless device 402 may also include (not shown) multiple transmitters, multiple receivers, multiple transceivers, and/or multiple antennas.

The wireless device 402 may also include a signal detector 418 that can be used in an effort to detect and quantify the level of signals received by the transceiver 414. The signal detector 418 may detect such signals as total energy, energy per subcarrier per symbol, power spectral density and other signals. The wireless device 402 may also include a digital signal processor (DSP) 420 for use in processing signals. The DSP 420 can be configured to generate a packet for transmission. In some aspects, the packet may comprise a physical layer data unit (PPDU).

The wireless device 402 may further comprise a user interface 422 in some aspects. The user interface 422 may comprise a keypad, a microphone, a speaker, and/or a display. The user interface 422 may include any element or component that conveys information to a user of the wireless device 402 and/or receives input from the user.

The wireless devices 402 may further comprise a high-efficiency wireless component 424 in some aspects. The high-efficiency wireless component 424 may include a classifier unit 428 and a transmit control unit 430. As described herein, the high-efficiency wireless component 424 may enable APs and/or STAs to use a modified mechanism that minimizes the inefficiencies of the CSMA mechanism (for example, enables concurrent communications over the medium in situations in which interference would not occur).

The modified mechanism can be implemented by the classifier unit 428 and the transmit control unit 430. In an embodiment, the classifier unit 428 determines which devices are in a state or condition such that they can communicate concurrently with other devices and which devices are in a state or condition such that they cannot communicate concurrently with other devices. In an embodiment, the transmit control unit 430 controls the behavior of devices. For example, the transmit control unit 430 may allow certain devices to transmit concurrently on the same medium and allow other devices to transmit using a spatial multiplexing or frequency domain multiplexing technique. The transmit control unit 430 may control the behavior of devices based on the determinations made by the classifier unit 428.

The various components of the wireless device 402 can be coupled together by a bus system 426. The bus system 426 may include a data bus, for example, as well as a power bus, a control signal bus, and a status signal bus in addition to the data bus. Those of skill in the art will appreciate the components of the wireless device 402 can be coupled together or accept or provide inputs to each other using some other mechanism.

Although a number of separate components are illustrated in FIG. 4, those of skill in the art will recognize that one or more of the components can be combined or commonly implemented. For example, the processor 404 can be used to implement not only the functionality described above with respect to the processor 404, but also to implement the functionality described above with respect to the signal detector 418 and/or the DSP 420. Further, each of the components illustrated in FIG. 4 can be implemented using a plurality of separate elements.

The wireless device 402 may comprise an AP 104, a STA 106, an AP 254, a STA 256, and/or an AP 304, and can be used to transmit and/or receive communications. That is, either the AP 104, STA 106, AP 254, STA 256, or AP 304 may serve as transmitter or receiver devices. Certain aspects contemplate signal detector 418 being used by software running on memory 406 and processor 404 to detect the presence of a transmitter or receiver.

Figure 5A:
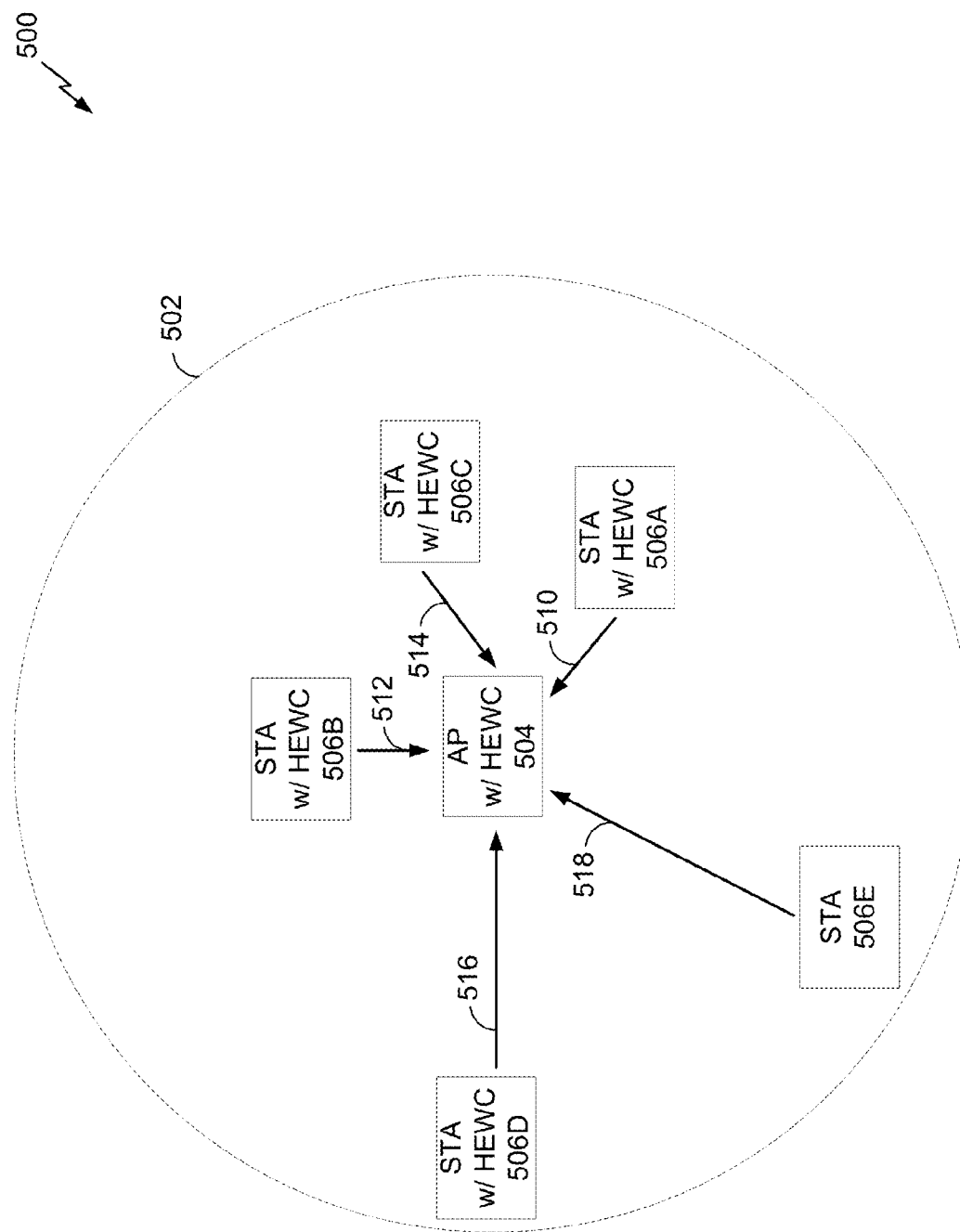
FIG. 5A shows the wireless communication system in which aspects of the present disclosure can be employed.

FIG. 5A shows the wireless communication system 500 in which aspects of the present disclosure can be employed. As illustrated in FIG. 5A, the wireless communication system 500 includes a BSA 502. The BSA 502 may include the AP 504 and STAs 506A-506E. In an embodiment, the AP 504 and the STAs 506A-506D each include the high-efficiency wireless component discussed above. However, the STA 506E does not include the high-efficiency wireless component. Thus, STAs 506A-506D are referred to as high-efficiency STAs, whereas STA 506E is referred to as a legacy STA (for example, because it is compatible with regular IEEE 802.11 protocols, such as IEEE 802.11n, IEEE 802.11ac, etc.).

In some embodiments, the legacy STA 506E would reserve an entire available bandwidth (for example, 80 MHz) while transmitting to a legacy AP (which does not include the high-efficiency wireless component) via a legacy channel (for example, 20 MHz). In an embodiment, the high-efficiency AP 504 can be configured to receive data on multiple sub-channels simultaneously. For example, the STA 506A can transmit to the AP 504 via uplink (UL) communication 510, the STA 506B can transmit to the AP 504 via uplink (UL) communication 512, and the STA 506C can transmit to the AP 504 via uplink (UL) communication 514 at the same time as the STA 506E transmits to the AP 504 via uplink (UL) communication 518. In the illustrated embodiment, the UL communication 518 can be a legacy channel communication, and the UL communications 510, 512, and 514 can be high-efficiency channel communications occupying unused available sub-channels. In an embodiment, the STA 506D can also transmit to the AP 504 via UL communication 516. As illustrated in FIG. 5A, STAs 506A-506C can be located closer to the AP 504 than STAs 506D-506E. The UL communications 510, 512, 514, 516, and 518 can be made by the AP 504 according to the uplink frequency domain multiplexing (UL FDM) protocol described herein.

An UL FDM protocol may include three data exchange stages: (1) data transmission; (2) protection; and (3) acknowledgment. The protection stage may precede the data transmission stage and the acknowledgment stage may follow the data transmission stage. In the protection stage, techniques can be employed to prevent interference. In the data transmission stage, data one or more STAs may transmit data to the AP. In the acknowledgment stage, the STAs may confirm that the AP received the appropriate data. Each of these stages may occur concurrently on different channels according to the frequency domain multiplexing principles discussed herein. In addition, the UL FDM protocol may include rules related to the timing of the start of transmissions by the STAs 306A-306E (FIG. 3).

Data Transmission Stage

During the UL data transmission stage, data is transmitted simultaneously by multiple STAs on different channels. The STAs can transmit on any channel discussed herein, particularly those within the available bandwidth. In an embodiment, several data transmission options are available during the data transmission stage. In particular, several options are available for allocating STAs on different channels such that the STAs can communicate concurrently. These options may also allow for both legacy STAs and high-efficiency STAs to communicate concurrently. Thus, the techniques described herein to improve network throughput and reduce latency can be implemented in devices that are compatible with high-efficiency STAs and that are backwards compatible with existing legacy STAs.

For example, an existing PHY layer of the regular IEEE 802.11 protocol (for example, the 802.11n, 802.11ac, etc.) can be coupled with a new media access control (MAC) mechanism to allocate STAs on different channels. As another example, a new PHY layer preamble can be created for the high-efficiency 802.11 protocol and be used by STAs on different channels. As another example, the existing PHY layer of the regular IEEE 802.11 protocol and the new PHY layer preamble can be used by STAs to transmit STAs on different channels simultaneously or essentially simultaneously.

Figure 5B:
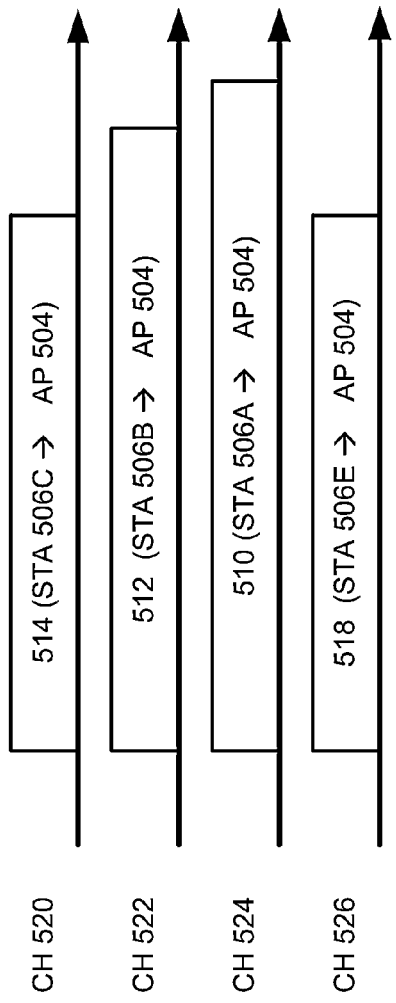
FIGS. 5B-5C show a timing diagram in which aspects of the present disclosure can be employed.
Figure 5C:
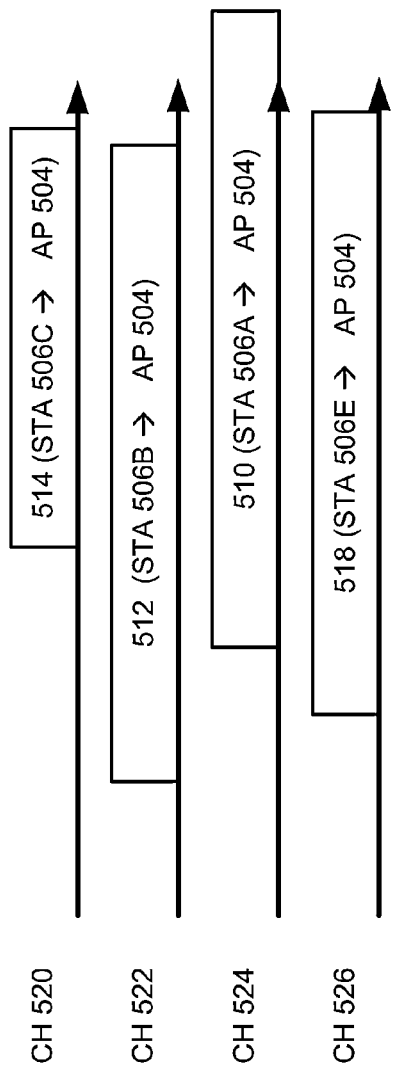

FIGS. 5B-5C show a timing diagram in which aspects of the present disclosure can be employed. In particular, FIGS. 5B-5C show a timing diagram that can be used in accordance with the existing PHY layer of the regular IEEE 802.11 protocol and the new MAC mechanism. As illustrated in FIGS. 5B-5C, four channels are present: channel 520, channel 522, channel 524, and channel 526. As discussed above, the term channel used herein can refer to any of a contiguous portion of spectrum or a set of non-adjacent intervals of spectrum, in which case the term bandwidth for the channel can refer to the sum of the bandwidth of each interval. As used herein, channel 526 is referred to as a primary channel (for example, a default channel used by STAs operating on the regular IEEE 802.11 protocol) and channels 520, 522, and 524 are referred to as secondary channels. In some embodiments, legacy STAs can only transmit on secondary channels in combination with transmission on the primary channel. In contrast, in various embodiments, HEW STAs can transmit packets on the primary channel, on the primary channel in combination with secondary channels, or on secondary channels without including the primary channel. The channels 520, 522, 524, and 526 can be contiguous (for example, each channel 520, 522, 524, and 526 covers consecutive 20 MHz frequency ranges, such as from 1000 MHz to 1080 MHz) or non-contiguous (for example, there are gaps in frequency between one or more of the channels 520, 522, 524, and/or 526).

In one embodiment all transmissions come from HEW STAs. In another embodiment, one transmission comes from a legacy STA, and one or more other transmissions come from one or more HEW STAs. In various embodiments, the transmission bandwidth of each STA can be same or can be different. In various embodiments, exemplary bandwidths used by each STA can include one or more of 2.5 MHz, 5 MHz, 7.5 MHz, 10 MHz, 15 MHz, 20 MHz, 30 MHz, 40 MHz, 60 MHz, and 80 MHz. In some embodiments, transmissions from all the STAs can be allocated such that no transmissions are on adjacent channels.

In an embodiment, the primary channel (alone or in combination with additional secondary channels, for example in legacy 11n/11ac operation) is used for communications from legacy STAs (for example, STA 506E) to the AP 504. Secondary channels are also used for communications from high-efficiency STAs (for example, STAs 506A-506D) to the AP 504.

In various embodiments, duration of the transmission from multiple STAs can be same or different. Different amounts of data and different data rate used for the transmission can result in a different time for the transmission of each data. In certain cases, it is advantageous that all the transmissions end at the same time, irrespective of the different minimum times that would be used by each STA to send the data. In such cases where all the transmissions end at the same time, each STA can include one or more additional padding bytes to the frame, so that the frame length matches a target frame length. The target duration can be indicated in a frame received immediately before the transmission (for example, the reference signals CTX described below with respect to FIGS. 6A-6C), and/or can be previously negotiated or indicated by the AP. In various embodiments, the padding operation can be performed by adding one or more aggregated media access control protocol data unit (A-MPDU) sub-frames and/or padding bytes, for example as defined in the IEEE 802.11 ac standard.

In an embodiment, the AP 504 transmits, and the STAs 506A-506E receive, a MAC message that associates the STAs 506A-506E with channels, thereby indicating which channel the AP 504 plans to use to communicate or receive a communication with a respective STA 506A-506E. In some embodiments, the AP 504 defaults to communicating with the STA 506E on the primary channel since the STA 506E is a legacy STA. Similarly, the STA 506E can default to the primary channel for transmissions to the AP 504. Thus, the AP 504 may not transmit the MAC message to the STA 506E. Rather, the AP 504 may transmit the MAC message only to the high-efficiency STAs 506A-506D. In other embodiments, the AP 504 transmits the MAC message to each STA 506A-506E. In various embodiments, the MAC message can include one or more management frames sent from the AP 504 to the STAs 506A-506D, and can include an indication of the allocated channel for each STA (either explicitly or implicitly such as based on a categorization). In some embodiments, the MAC message is referred to as a reference signal, described in greater detail below with respect to FIG. 7A.

Channel Access

In various embodiments, it can be beneficial to synchronize the start of transmission by the STAs 506A-506E. For example, it can be easier to decode the transmissions when they start at the same time. Because the STAs 506A-506E are disparate devices, however, it can be challenging to coordinate a synchronized transmission time. In various embodiments, transmission can be synchronized based on a solicited or unsolicited reference signal from the AP 504. In other embodiments, transmission can be synchronized based on a schedule set by the AP 504 and/or STAs 506A-506E.

Figure 6A:
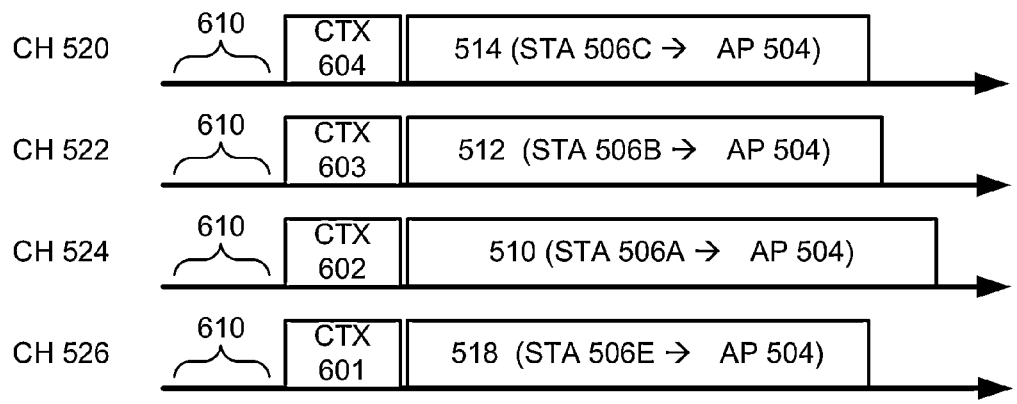
FIGS. 6A-6C show another timing diagram in which aspects of the present disclosure can be employed.
Figure 6B:
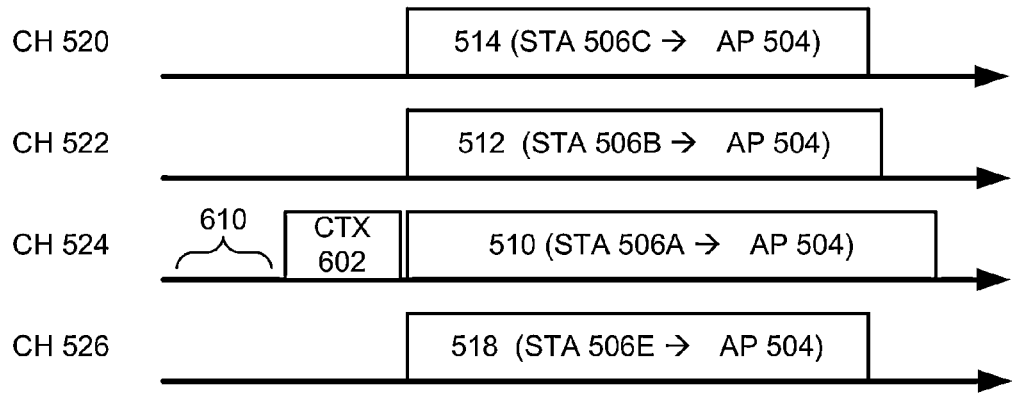
Figure 6C:
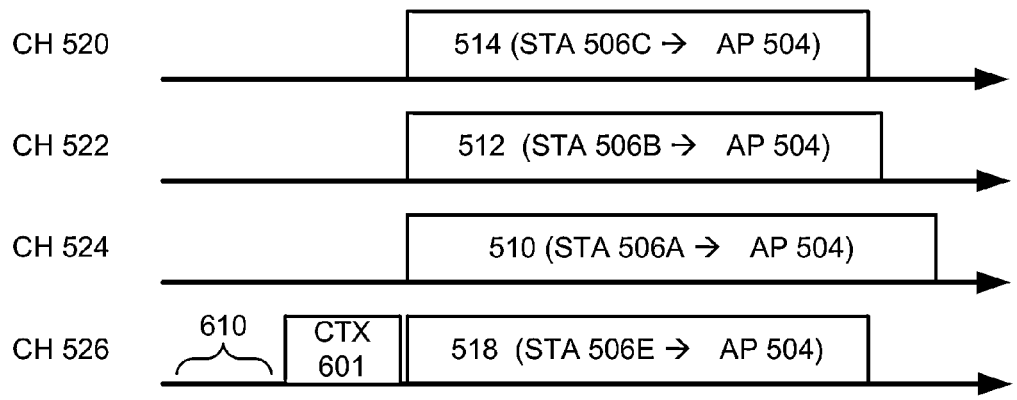

FIGS. 6A-6C show another timing diagram in which aspects of the present disclosure can be employed. As described above, the primary channel (for example, channel 526) and/or one or more of the secondary channels (for example, channels 520, 522, and/or 524) can be used for transmissions by legacy STAs and the primary channel and/or secondary channels can be used for transmissions by high-efficiency STAs. The channels 520, 522, 524, and/or 526 may or may not be contiguous. In an embodiment, the AP 504 can transmit one or more unsolicited reference signals CTX 601-604 to the STAs 506A-506E. The reference signals CTX 601-604 can indicate that STAs with data to send should begin transmitting upon receipt (or at a predetermined synchronization point after receipt). The synchronization point can be at, for example, a short inter-frame space (SIFS), a point coordination function (PCF) inter-frame space (PIFS), or another predefined time after the end of reception of the CTX frame. In an embodiment, the STAs 506A-506E receive the reference signal CTX 601-604 can begin to transmit the communications 510, 512, 514, and 518. The reference signals CTX 601-604 are described in greater detail herein with respect to FIG. 7A. In various embodiments, the synchronization point can be referred to as a time of joint transmission.

As shown in FIG. 6A, the AP 504 can transmit the reference signal CTX 601-602 on a plurality of sub-channels, or even all sub-channels. In FIG. 6A, the STAs 506A-506E are only able to receive on their assigned channel. Accordingly, the AP 504 transmits the reference signal CTX 601-604 on all channels. In some embodiments, each CTXs can contain same information. In some embodiments, various CTXs can contain different information on each channel. In some embodiments, the STAs 506A-506E can receive the reference signal on any channel. Accordingly, as shown in FIG. 6B, the AP 504 may transmit a single reference signal CTX 602 on any sub-channel that can be received by the STAs 506A-506E, for example, on the primary channel.

The embodiment shown in FIG. 6C, the legacy STA 506E can only receive the reference signal CTX 601 on the primary channel 526. However, the HEW STAs 506A-506C are able to receive the reference signal CTX 601 on any channel. Accordingly, the AP 504 transmits the reference signal CTX 601 on the primary channel 526. In various embodiments, other combinations of STA capability are possible.

In general, the AP 504 can be configured to transmit the reference signals CTX 601-604 on a minimum number of sub-channels in order to notify all target STAs. 506A-506E. In some embodiments, where more than one sub-channel will suffice, the AP 504 may transmit a reference signal CTX 601 on the sub-channel with the least interference, or may transmit one or more redundant reference signals CTX 601-604. The reference signals CTX 601-604 sent on multiple sub-channels can be exactly same, or can be different per sub-channel.

In an embodiment, a random back-off counter can be associated with a CTX transmission channel (such as the primary channel 526 in FIG. 6C), as defined by the enhanced distributed channel access (EDCA) procedure of IEEE 802.11. When the random back-off counter expires, the AP 504 can begin preparing one or more reference signals CTX 601-604 for transmission to the STAs 506A-506E. If the intended CTX transmission channel has been idle since a time period 610 before the time that the random back-off counter expired, then the AP 504 may transmit the one or more reference signals CTX 601-604. Thus, once the random back-off counter expires, at least one transmission is made over the primary channel. In an embodiment, the time period 610 can be based on a PIFS time. The PIFS time can be chosen by the AP 504 and/or STAs 506A-506E.

Figure 6D:
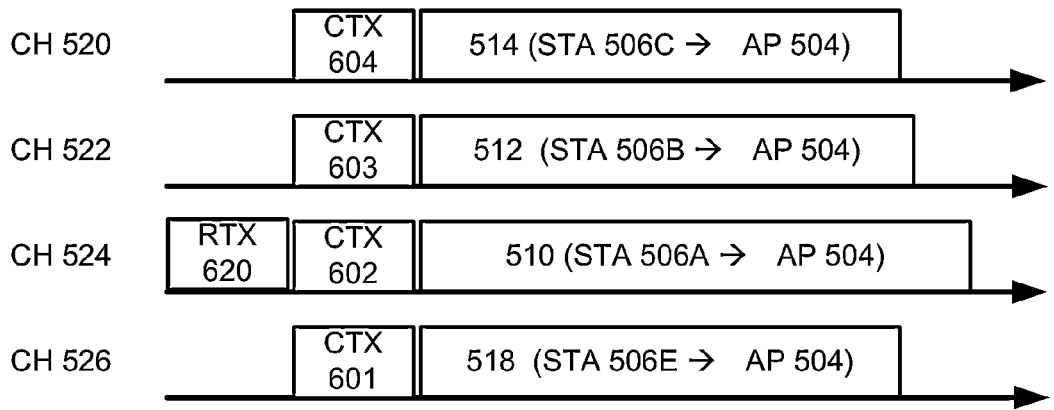
FIGS. 6D-6F show another timing diagram in which aspects of the present disclosure can be employed.
Figure 6E:
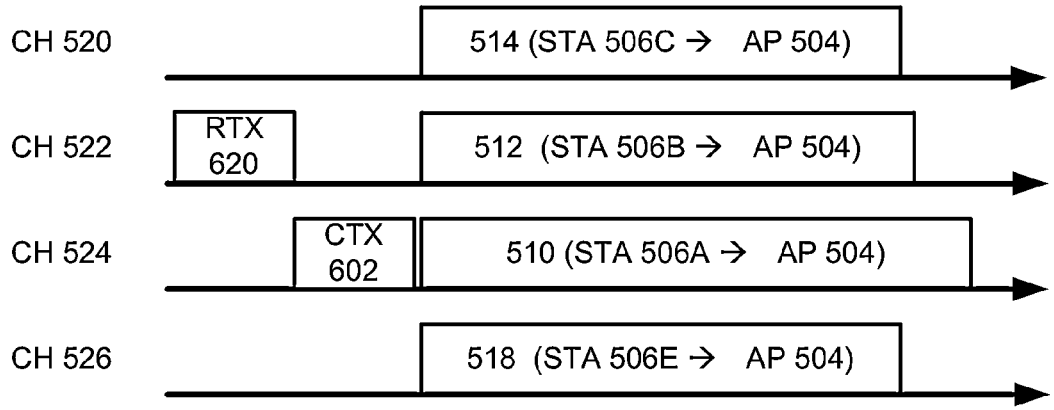
Figure 6F:
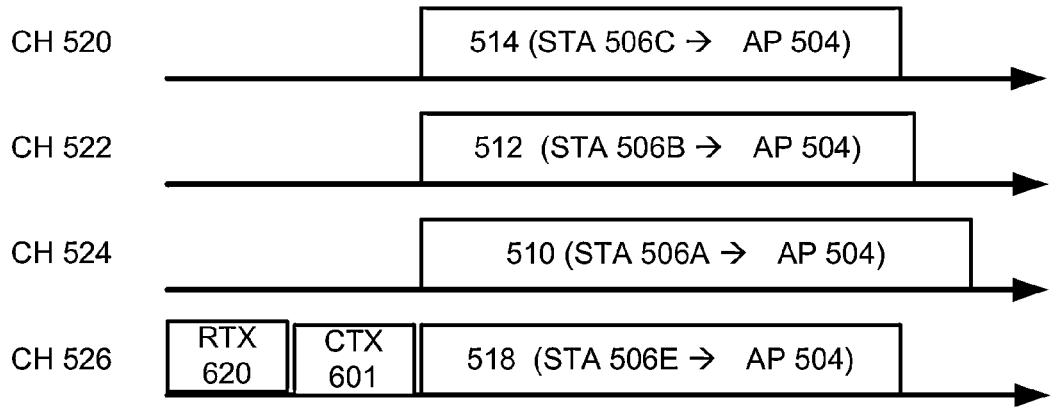

FIGS. 6D-6F show another timing diagram in which aspects of the present disclosure can be employed. As described above, the primary channel (for example, channel 526) and/or one or more of the secondary channels (for example, channels 520, 522, and/or 524) can be used for transmissions by legacy STAs and the secondary channels can be used for transmissions by high-efficiency STAs. The channels 520, 522, 524, and/or 526 may or may not be contiguous. In an embodiment, one or more STAs 506A-506E can request the reference signals CTX 601-604 by transmitting a request-to-send (RTX) 620. In various embodiments, an RTX can be compatible with legacy hardware. For example, the RTX can include an RTS as defined in IEEE 802.11, or can include another frame. In response, the AP 504 can transmit one or more solicited reference signals CTX 601-604 to the STAs 506A-506E. The reference signals CTX 601-604 can indicate that STAs with data to send should being transmitting upon receipt (or at a predetermined synchronization point after receipt). In an embodiment, the STAs 506A-506E receive the reference signal CTX 601-604 can begin to transmit the communications 510, 512, 514, and 518. As described in greater detail herein, CTX messages can identify which STAs are allowed to transmit and on which channels.

As shown in FIG. 6D, the AP 504 can transmit the reference signal CTX 601-602 over a plurality of sub-channels, or even all sub-channels. In FIG. 6A, the STAs 506A-506E are only able to receive on their assigned channel. Accordingly, the AP 504 transmits the reference signal CTX 601-604 on all channels. In other embodiments, the STAs 506A-506E can be able to receive the reference signal on any channel. Accordingly, as shown in FIG. 6E, the AP 504 may transmit a single reference signal CTX 602 on any sub-channel that can be received by the STAs 506A-506E. In various embodiments, the AP 504 may transmit a single reference signal CTX 602 on a different channel as the RTX 620. As shown in FIG. 6F, the AP 504 may transmit a single reference signal CTX 602 on the same channel as the RTX 620.

In general, the AP 504 can be configured to transmit the reference signals CTX 601-604 on a minimum number of sub-channels in order to notify all target STAs. 506A-506E. In some embodiments, where more than one sub-channel will suffice, the AP 504 may transmit a reference signal CTX 601 on the sub-channel with the least interference, or may transmit one or more redundant reference signals CTX 601-604.

In various embodiments, any STAs 506A-506E with data to send can transmit the RTX 620, which can be compatible with legacy hardware such as the STA 506E. In some embodiments, a STA transmits the RTX 620 on the same channel on which it will transmit data. In other embodiments, the HEW STAs 506A-506E can transmit the RTX 620 on any available channel, a channel with the least interference, a first available channel according the EDCA, etc.

The STAs 506A-506E can transmit the RTX according to EDCA, as discussed above with respect to the CTX 601-604. Particularly, a random back-off counter can be associated with a RTX transmission channel (such as the primary channel 526 in FIG. 6F), as defined by the enhanced distributed channel access (EDCA) procedure of IEEE 802.11. When the random back-off counter expires, the STA 506E can transmit an RTX frame 620 in a designated channel (for example, the primary channel) for transmission to the AP 504. If additional channels (for example, non-primary channels) RTX have been idle since a time period 610 (see FIG. 6C) before the time that the random back-off counter expired, then the STA 506E may transmit the one or more RTX frames 620 on the primary and on the available secondary channels. Upon reception of RTX, the AP 504 can respond with a CTS or CTX frame in same set or subset of the channel where the RTX is received, and can send a CTX in one or more additional channels not within the channels where the RTX was received. In particular, the channels where the CTX is sent can include the channels where the medium was determined to be idle. In some embodiments, the medium can be determined to be idle by checking the channel for a PIFS time before the RTX reception or for a SIFS time after the RTX reception. In an embodiment, the time period 610 can be based on a PIFS time. The PIFS time can be chosen by the AP 504 and/or STAs 506A-506E.

In one embodiment, the CTX can include information granting transmission to the STA 506E on the channels where the RTX was sent and can include information granting transmission to other STAs on the channels where the RTX was not sent. In another embodiment, the CTX can include information granting transmission for the STA 506 on a subset of the RTX channels and may grant transmission to other STAs on the channels where the RTX was not sent.

The operation herein described, is advantageous at least because RTX frames can be an RTX in a legacy format and can be sent by a legacy STAs (such as the STA 506E), hence allowing a legacy STA to initiate an UL transmit procedure. In some embodiments where the RTX is sent by a legacy STA, the AP 504 can respond with a CTX having a format compatible with the format of a legacy CTS, thus enabling consistent operation at the STA. In various embodiments, the AP 504 can detect whether an RTX was received from a legacy or high efficiency STA by, for example, comparing a transmit address with a stored lookup table. In other embodiments, the AP 504 can detect whether an RTX was received from a legacy or high efficiency STA by reading an explicit indication embedded in the legacy RTX format.

In various embodiments, the RTX can include a control frame including one or more of the following fields: a frame control, a duration, a source address, a destination address, and an information payload. The information payload can include one or more of the following indications: a requested transmission time, a size of a transmission queue, a quality-of-service (QoS) indication for the requested transmission, and a requested transmission bandwidth. The QoS indication can include, for example, a traffic identifier (TID), a transport stream identifier (TSID), and/or any other QoS Class). In various embodiments, the RTX control frame can omit one or more fields discussed above and/or include one or more fields not discussed above, including any of the fields discussed herein. A person having ordinary skill in the art will appreciate that the fields in the RTX control frame discussed above can be of different suitable lengths, and can be in a different order. In various embodiments, the RTX frame can include a data frame and can additionally include a high throughput control (HTC) field with an indication reverse decision grant (RDG)=1. In some embodiments, such a frame according to IEEE 802.11 can signal that a portion transmit opportunity indicated by the duration field and not used by the current transmission can be used by the recipient AP. The recipient AP can use the transmit opportunity to initiate an uplink (UL) frequency division multiple access (FDMA) transmission in any of the modes described herein.

In some embodiments, the AP 504 and/or the STAs 506A-506E can determine a scheduled time at which the STAs 506A-506E should begin transmitting. For example, scheduling mechanisms can be used to define a time that the AP 504 should expect packets from the STAs 506A-506E. One scheduling mechanism can be based on a reference time agreed between the AP and each individual STA via a management exchange. In various embodiments, the reference time can be periodic, intermittent, or randomly or pseudo randomly determined. Selection of the reference time can be achieved with a protocol such as a target wakeup time (TWT) timing, which is defined in the IEEE 802.11 ah protocol. In some embodiments, the AP can define the same reference time for multiple STAs by setting the TWT to same value for multiple STAs. The TWT timing can be a time during which a STA is scheduled to be awake. As another example, another scheduling mechanism can be based on defining a reference time for a group of STAs and an associated interval of time where access is restricted to the group of STAs. For example, such scheduling can be achieved with a restricted access window (RAW) timing, which is defined in the IEEE 802.11ah protocol. The RAW timing can be an interval of time during which access to a medium is restricted to a group of STAs. In various embodiments, the interval of time can further be slotted and each slot assigned to one or more STAs, indicating that STAs can transmit UL data at the start of the slot time.

At the reference time defined in any of above modes, STAs can be ready to receive a CTX frame for initiating the transmission. In some embodiments, STAs may start transmission without waiting for the CTX. Thus, in various embodiments, STAs can be transmitting at exactly the reference time, or it can perform a clear channel assessment procedure on the intended transmission channel, starting at the reference time. In various embodiments, the channel assessment may require a PIFS time or DIFS time. If the target channel is determined to be busy, the STA can refrain from transmitting.

In another embodiment the STAs can be operating in HCCA mode, during a Contention Free period. In thin case STAs are not allowed to access the medium until a CF-Poll message is received (802.11); the HCCA protocol can be modified such that the CF-Poll message identifies more than one STAs for UL transmission at SIFS time after the CF-Poll frame. The CF-Poll can be replaced with any of the CTX frames described herein.

The AP 504 may further include in management messages used to set up the scheduled time (for example, an RPS information element for RAW, TWT setup messages for TWT, etc.) an indication of the channel allocation for the benefit of the STAs. In another embodiment, the allocation indicated by the AP 504 in such a message can be in response to a message transmitted by a STA to the AP 504 requesting the use of a specific channel or simply the allocation of a channel. The message can be included in a management frame.

The transmissions from the STAs 506A-506E may start at the time scheduled according to the TWT timing or the RAW timing. In an embodiment, the random back-off counter, the PIFS timing, and/or the AIFS timing can be used as described herein to determine whether the channel has been idle for an appropriate amount of time. A benefit of scheduling a transmission time based on the TWT timing or the RAW timing can be that the AP 504 then knows when the STAs 506A-506E will be awake. In another embodiment, the STAs 506A-506E may not use the random back-off counter, the PIFS timing, and/or the AIFS timing. In still another embodiment, the STAs 506A-506E may not use the PIFS timing and/or the AIFS timing on secondary channels. In some embodiments, the AP 504 can transmit the reference signal CTX 601-604 at the scheduled time. For example, the AP 504 can use the same scheduling mechanism as the STAs 506A-506E (for example, TWT timing or RAW timing) to determine when to transmit the reference signal CTX 601-604. In an embodiment, the AP 504 can transmit the reference signal CTX 601-604 after sensing the medium as idle on the intended CTX channel. In various embodiments, the AP 504 can transmit the reference signal CTX as described above with respect to the RTX 620. In various embodiments, the CTX message can be sent once at the beginning of the RAW and be used for time synch for all the slots in the RAW. In some embodiments, the CTX can be sent at the start of each slot, providing synchronization and other information per each transmission.

Format of the Reference Signal

In various embodiments, the reference signals CTX 601-604 can include a clear-to-send frame, an extended clear-to-send frame, and/or an aggregated MAC protocol data unit (MPDU) including a clear-to-send frame and a new frame including an extended payload. In some embodiments, reference signals can be referred to as MAC messages. In various embodiments, one or more reference signals CTX 601-604 can include the same format (or compatible) as a legacy CTS as defined in 802.11. In one embodiment, reference signals CTX 601-604 include a multicast MAC address, for example, in a receiver address (RA) field of the CTS. In another embodiment, the reference signals CTX 601-604 can have same format (compatible format) as a CF-Poll frame as defined in 802.11 or a Synch frame as defined in 802.11ah. Poll frames can include a multicast receiver address.

In various embodiments, the reference signals CTX 601-604 can include one or more of the following indications: a deferral time for third party STAs, one or more identifiers of STAs that are eligible to transmit via UL-FDMA at one certain (for example, a short inter-frame space (SIFS), a point coordination function (PCF) inter-frame space (PIFS), or longer) time after the reference signal frame, indications of a power at which each of the STAs 506A-506E should transmit (for example, an indication of the backoff with respect to a reference power), an indication, for each STA, of the channel(s) and/or bandwidth the STAs 506A-506E should use to transmit, channel assignments for one or more STAs, a time synchronization indication, an ACK policy indication for one or more STAs, an exact or maximum duration of the data transmission, a number of spatial streams or number of space-time streams for each STA, an indication of the length of all the information fields included in the CTX, a timestamp or partial timestamp indicating a time synchronization function (TSF) at the transmitter, etc. The identifier of STAs that are eligible to transmit can include a list of addresses (for example, MAC addressed, AIDs, partial or hashed AIDs, etc.) and/or one or more group identifiers. The group identifier can include, for example, a multicast MAC address previously associated to a group of STAs and communicated to the STAs, or a group identifier previously defined and communicated to the STAs. The transmit power indicator can include, for example, an absolute power indicator or an indication of a back-off from a STA nominal transmit power, which the STAs 506A-506E can indicate. In various embodiments, one or more of the aforementioned payload elements can be negotiated or predetermined between each STA 506A-506E and the AP 504.

The payload elements can be included in an extended payload, or distributed in other fields.

Figure 7A:
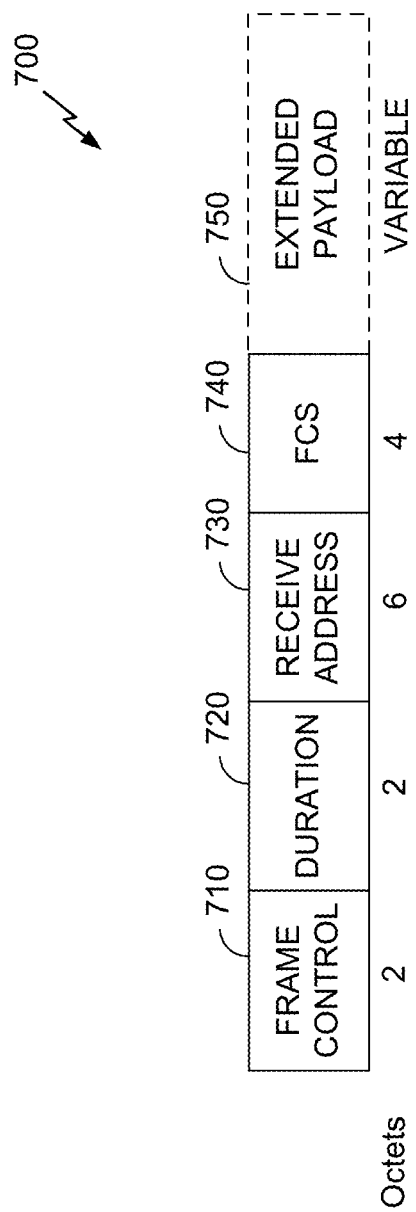
FIG. 7A shows an example reference signal that can be employed within the wireless communication systems of FIGS. 1, 2B, and 3.

FIG. 7A shows an example reference signal 700 that can be employed within the wireless communication systems of FIGS. 1, 2B, and 3. In the illustrated embodiment, the reference signal 700 includes a frame control field 710, a duration field 720, a receive address field 730, a frame check sequence (FCS) 740, and an extended payload 750. As shown, the frame control field 710 is two bytes long, the duration field 720 is two bytes long, the receive address 720 is six bytes long, the FCS 740 is four bytes long, and the extended payload 750 is a variable length. In various embodiments, the reference signal 700 can omit one or more fields shown in FIG. 7A and/or include one or more fields not shown in FIG. 7A, including any of the fields discussed herein. A person having ordinary skill in the art will appreciate that the fields in the reference signal 700 can be of different suitable lengths, and can be in a different order. In particular, the extended payload 750 can be omitted. In some embodiments, the reference signal 700 is a clear-to-send frame.

In various embodiments, the extended payload 750 can include one or more of the payload elements or indications discussed above. Particularly, the extended payload can include a an identifier of STAs that are eligible to transmit via UL-FDMA at a time after the reference signal frame, an indication of a power at which the STAs 506A-506E should transmit, an indication of the channel(s) and/or bandwidth the STAs 506A-506E should use to transmit, specific channel assignments, and/or a synchronization indication. In various embodiments, the time after the reference signal frame can include a SIFS, a PIFS, or a time longer than PIFS. In various embodiments, the time can be indicated by the AP 504 (FIG. 5A) in the reference signal 700, or communicated by the AP 504 to STAs in a previous message, or defined by the standard. The AP 504 can define the time based on indications received from STAs In an embodiment, the reference signal 700 can include an indication that the reference signal 700 includes an extended CTS frame including the extended payload 750. For example, the reference signal 700 can set one or more bits normally reserved in control frames to indicate the presence of the extended payload 750. Accordingly, a legacy STA 506E can be able to interpret at least some fields of the CTS frame.

In some embodiments, the CTX frame can include one or more padding bytes inserted after the information bytes. The purpose of the padding byte can be to increase the length of the CTX, so as to provide additional time for the processing of the CTX information from the recipient STAs. The padding bytes can be identified as following the information bytes, according to the length of the information bytes indicated in one of the CTX fields.

In some embodiments, the reference signal 700 can omit the extended payload 750 and/or include a control wrapper frame indicating the presence of a high-throughput control (HTC) field. The HTC field may provide four bytes that can be used to embed identifiers of target STAs information. As another example, a special CTS message may include additional information after the FCS field.

In some embodiments the CTX message can include a CTS message with an HT Control field (for example, as defined in IEEE 802.11). The presence of the HT Control (HTC) field in the CTS can be identified, for example as defined in the IEEE 802.11 standard. The HTC field can be overridden to carry one or more of the indications listed above. The fact that the HTC is overridden to signal the above information can be indicated by one or more of: the type of PHY preamble used for the transmission, and one or more bits in the HTC control field itself.

In some embodiments, the CTX can be a data frame and can include an HTC field with reverse decision grant (RDG)=1, indicating that the AP is allowing the recipient to use the remainder of the duration time for a transmission. In particular, this may act as the trigger indication for the UL FDMA transmissions. Moreover, the HTC field can be overridden to carry the necessary information, as described above.

In some embodiments, the CTX frame can be the same or similar to a power save multi-poll (PSMP) frame (for example, as defined by the 802.11 standard), wherein the PSMP-UTT start offset within a STA info field identifies the start time for the UL FDMA transmissions, the PSMP UTT duration identifies the duration of the UL FDMA transmission and the STA ID field may include an identifier of the STAs allowed to transmit. Moreover the reserved bits can be used to indicate a power backoff, a transmission bandwidth (BW), and/or a channel allocation. Multiple STA info fields can be included in a same PSMP frame, with a same value of start offset and duration, hence indicating that multiple STAs can transmit in UL FDMA at the indicated times.

FIG. 7B shows exemplary reference signal formats and fields that can be employed within the wireless communication systems of FIGS. 1, 2B, and 3. In the illustrated embodiment, the reference signal is the same or similar to a PSMP frame, as discussed above. In various embodiments, the reference signal of FIG. 7B can omit one or more fields shown in FIG. 7B and/or include one or more fields not shown in FIG. 7B, including any of the fields discussed herein. A person having ordinary skill in the art will appreciate that the fields in the reference signal of FIG. 7B can be of different suitable lengths, and can be in a different order.

As shown in FIG. 7B, a PSMP parameter set fixed field can include a five-bit number of STAs field N_STA, a six-bit More PSMP field, and a 10-bit PSMP Sequence Duration field. A PSMP STA Info fixed field, when group addressed, can include a two-bit STA_INFO Type field (set to "1"), an 11-bit PSMP-DTT Start Offset field, an 8-bit PSMP-DTT Duration field, and a 43-bit PSMP Group Address ID. The PSMP STA Info fixed field, when individually addressed, can include a two-bit STA_INFO Type field (set to "2"), an 11-bit PSMP-DTT Start Offset field, an 8-bit PSMP-DTT Duration field, a 16-bit STA_ID field, an 11-bit PSMP-UTT Start Offset field, a 10-bit PSMP-UTT Duration field, and six reserved bits. A PSMP frame Action field can include a category field, an HT Action field, a PSMP Parameter Set, and one or more PSMP STA Info fields repeated N_STA times.

In various embodiments, a new value of the STA info type can be used to indicate that the STA info field includes the start offset field, the duration field, and a field identifying the multiple STAs allowed to transmit (for example, as a group identifier, a list of addresses or partial addresses, etc.). In some embodiments, the group of destination STAs can be identified by the receive address (RA) of the frame itself. In various embodiments, the reference signal can otherwise include the rest of the PSMP frame format. Advantageously, the use of the PSMP frame allows indicating multiple UL and DL schedules for UL and DL transmissions.

Figure 7C:
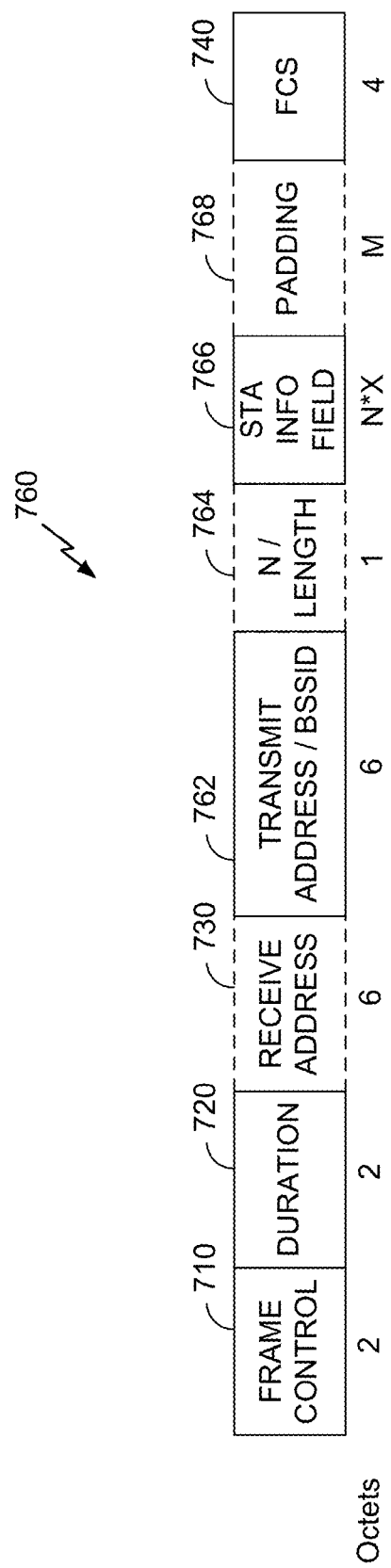
FIG. 7C shows an example reference signal that can be employed within the wireless communication systems of FIGS. 1, 2B, and 3.

FIG. 7C shows an example reference signal 760 that can be employed within the wireless communication systems of FIGS. 1, 2B, and 3. In the illustrated embodiment, the reference signal 760 includes the frame control field 710, the duration field 720, the receive address field 730, a transmit address field 762, a length field 764, a STA info field 766, one or more optional padding bits 768, and the frame check sequence (FCS) 740. As shown, the frame control field 710 is two bytes long, the duration field 720 is two bytes long, the receive address 720 is six bytes long, the transmit address field 762 is six bytes long, the length field 764 is one byte long, the STA info field is a variable length N*X, the padding bits 768 are a variable length M, and the FCS 740 is four bytes long. In various embodiments, the reference signal 760 can omit one or more fields shown in FIG. 7C and/or include one or more fields not shown in FIG. 7C, including any of the fields discussed herein. A person having ordinary skill in the art will appreciate that the fields in the reference signal 760 can be of different suitable lengths, and can be in a different order. In particular, the receive address field 730, the length field 764, and/or the padding bits 768 can be omitted. In some embodiments, the reference signal 760 is a clear-to-send frame.

In various embodiments, the RA 730 is present only in case it is used for identifying the group of recipient STAs. The length field 764 may include either a length N in bytes of the information portion 766, or a number X of STA info fields. The STA info field 766 can include one or more of the per-STA indications listed above. In various embodiments, it can have the same length for each STA. The padding bits 768 can include M byes of padding, to increase the frame length.

In one embodiment, if the CTX message is sent over multiple channels, any of the following is possible: it can be sent as a single frame with a transmission BW spanning the total transmission BW allocated for UL transmissions; it can be sent as a duplicate across all the channels allocated for UL transmissions, i.e., the content of each CTX is exactly the same across channels; and it can be different per-channel, carrying different information for different STAs receiving on different channels. In various embodiments, CTSs sent on different channels with either different BW or different information can have a different length, which may be contrary to the purpose of providing a reference synchronization time to all the STA for the UL transmission. Thus, in order for all the CTSs to be of same length, each CTX can include a number of padding bytes so that the length of all the CTXs is same.

In another embodiment, the CTX frame can be followed by an additional "filler" frame sent by the same sender of the CTX, after a SIFS time. The filler frame can serve to keep the medium busy and provide additional time to the STAs for the processing and interpretation of the CTX information and for the preparation of the following UL transmission. In various embodiments, the filler frame can be any of an null data packet (NDP), CTS, or other control frame. The filler frame can also provide additional protection for the upcoming transmissions.

In various embodiments, the need for, or inclusion of, padding and/or a filler frame can be indicated by a STA to the AP with an indication at association (for example, in an association request) or through a management exchange. The STA can also indicate the amount of time required for processing, which can determine the amount of padding required.

When the transmission is initiated by the AP with a CTX, advantageously the AP can schedule transmissions at a time where multiple STAs are awake and have available data, hence maximizing the efficiency. When using scheduled modes, the AP may also indicate to the STAs that no transmission are allowed outside the scheduled periods. This indication can be included in the beacon or included in the setup phase (see "Setup," below) for each STA.

Transmission Eligibility

As discussed above, the AP 504 can indicate a list of STAs that are eligible to transmit, for example in the reference signal 700 (FIG. 7A) or during transmission scheduling. STAs 506A-506E can indicate that they have data to transmit in a QoS control field of any data packet sent by the STAs 506A-506E to the AP 504. In an embodiment, the STAs 506A-506E can transmit a QoS null data frame to the AP 504, which can include the QoS control field, to indicate that the STA 506A-506E has buffered units for transmission. In some embodiments, the STAs 506A-506E can transmit the QoS control field in any data frame using regular contention procedures. The AP 504 can receive the QoS control field, determine which STAs 506A-506E have data to transmit, and determine which STAs 506A-506E to indicate for transmission eligibility.

In some embodiments, the STAs 506A-506E can indicate that they have data to transmit by encoding an uplink data indication in a power-save poll (PS-Poll) frame according to 802.11 ah. In some embodiments, the STAs 506A-506E can indicate that they have data to transmit by transmitting another frame via regular CSMA contention. In some embodiments, the AP 504 can indicate a window during which STAs 506A-506E should transmit indications that they have buffered units. The window of time can be advertised in a Beacon and be essentially similar to a RAW in some embodiments. The advertisement can be achieved, for example, by using an RPS information element as defined by the IEEE 802.11 ah standard, with the following change: the type of the RAW is indicated to be for UL indication only. The AP can also schedule a TWT with each individual STA for allowing the STA to send an UL indication.

Channel Allocation

FIG. 8 shows another timing diagram 850 in which aspects of the present disclosure can be employed. As illustrated in FIG. 8, the AP 504 transmits channel allocation messages 802, 804, 806, and 808 on each of the channels 520, 522, 524, and 526, respectively. The channel allocation messages CHA 802, 804, 806, and 808 may provide information to the STAs 506A-506E regarding which channel is allocated to which STA. In some embodiments, the channel allocation messages 802, 804, 806, and/or 808 can be the MAC message or reference signal 800 (FIG. 8) described above.

In an embodiment, if the new PHY layer preamble 528 is available, the PHY layer preamble 528 includes a group identification field that corresponds to a channel allocation of the STAs of the group.

In an embodiment, the channels can be pre-allocated, selected by the STAs 506A-506E, and/or selected by the AP 506A-506E and explicitly messaged via the channel allocation messages 802, 804, 806, and/or 808. The channel allocation messages 802, 804, 806, and/or 808 can be sent at any time prior to the transmission by each STA. In another embodiment, the AP 504 can include channel allocation in the reference signals CTX 601-604 (FIGS. 6A-6F) or MAC frames 802, 804, 806, and/or 808 sent immediately before the data transmission 510, 512, 514, and/or 518. The channel allocation can be indicated by one or more MAC addresses, AIDs, partial or hashed AIDs, and corresponding channel identifiers.

In another embodiment, a group can be defined that includes multiple STAs, each STA can be assigned a position in the group, and the group can be identified by a group ID or by a multicast MAC address. Thus, a channel allocated to a STA can be identified by the group ID or multicast MAC address, and further by the position of the STA in the group identified by the group ID. Messages for setting up the group definitions can be sent at any time before the UL-FDMA data transmissions 510, 512, 514, and/or 518 and can be carried by management frames. Messages for indicating channel allocation for a certain data transmission can be conveyed by management or control frames sent before the data transmission 510, 512, 514, and/or 518 (for example, these frames may not be transmitted based on SIFS or PIFS as described above), or can be sent on a synchronization or MAC frame immediately preceding the data transmission 510, 512, 514, and/or 518. In embodiments where channel allocation is included in the reference messages CTX 601-604 or a CF-Poll frame, the receiver address can include a multicast MAC address corresponding to a group and hence identifying the channel for the STA.

In embodiments where the channels are pre-allocated, and when the number of STAs is above a threshold and traffic requests from the STAs are similar, then a random static allocation can be used (for example, each STA is allocated to a channel, semi-statically). The AP 504 may indicate to the STAs 506A-506E which station is allocated to which channel (for example, via the channel allocation messages 802, 804, 806, and/or 808). If the channels are selected by the STAs 506A-506E, STAs 506A-506E may select and wait on a channel preferred by the respective STA 506A-506E. The STAs 506A-506E may explicitly or implicitly (for example, via any transmission) notify the AP 504 of their presence on the respective channel.

In embodiments where the allocation is explicitly messaged, the channel allocation messages 802, 804, 806, and/or 808 can be sent on each of the channels or just a primary channel. Where the STAs 506A-506E implicitly notify the AP 504 of their presence, the AP 504 may know of a STA 506A-506E location based on reception of any data, control, and/or management frame transmitted by the STA 506A-506E for regular operation. In other words, the data, control, and/or management frame may not necessarily be designed for channel indication. In embodiments where the STAs 506A-506E are able to receive frames on multiple channels, the reception of a reference signal addressed to a STA on an certain channel can implicitly indicate that the certain channel is allocated to the addressed STA. Particularly, the AP 504 can transmit multiple reference frames CTX on multiple channels, each addressed to a different STA, thereby defining the channel allocation.

Protection Stage

In various embodiments, as discussed above with respect to FIGS. 6D-6F request to send (RTX) and CTX messages are used by the AP 504 and the STAs 506A-506E to ensure that a given channel is free. The duration field in RTX and CTS can indicate a duration that covers the immediately following transmission, plus the required acknowledgments.

Acknowledgment Stage

In an embodiment, restrictions can be placed on the duration of a packet. In some embodiments, transmissions by the STAs 506A-506E have different lengths. In other embodiments, transmissions by the STAs 506A-506E have the same length.

Following the UL communications 510, 512, 514, and/or 518, the AP 504 may respond with a block acknowledgment (BA) acknowledging that the DL communication was received. The AP 504 may respond with the BA on its own volition or can be prompted to by the STAs 506A-506E (for example, via a block acknowledgment request (BAR)). If the STAs 506A-506E are all able to receive on any channel, or are all able to receive on at least a same common channel (such as the primary channel), the AP 504 may broadcast a single block acknowledgment (BBA). The BBA frame carries block acknowledgment indications for multiple STAs, possibly all the STAs that sent data in UL. Additional information regarding BBA frames can be found in U.S. Provisional Application No. 61/267,734, filed Dec. 8, 2009, which is hereby incorporated by reference, and in an application entitled "METHOD AND APPARATUS FOR MULTICAST BLOCK ACKNOWLEDGEMENT," attached hereto.

In an embodiment, the BBA can be sent on the primary channel. In various embodiments, APs 504 and/or STAs 506A-506E can transmit BAs, BARs, and/or BBAs in a legacy or high-efficiency physical protocol data unit (PPDU) format. In some embodiments where the APs 504 and/or STAs 506A-506E transmit BAs, BARs, and/or BBAs in high efficiency PPDU format, the bandwidth can be smaller than 20 MHz. Moreover different BAs, BARs, and/or BBAs can have different durations, which can depend on a bandwidth used for transmission. Timing diagrams included herein, and the various messages they show, are not to scale.

FIGS. 9A-9C show additional timing diagrams in which aspects of the present disclosure can be employed. In particular, FIGS. 9A-9C illustrate the use of BAs, BARs, and BBAs as described herein. In an embodiment, transmissions 51, 512, 514, and 518 do not end at the same time, the AP 504 responds immediately with a BA after the UL communication is complete. The AP 504 then responds to the remaining transmissions with a BA after receiving a BAR. The STAs 506A-506E may transmit the BAR on the channel that the UL communication was transmitted on, the primary channel, the high-efficiency primary channel (for example, a primary channel defined for use by the high-efficiency devices), and/or any other channel.

For example, as illustrated in FIG. 9A, the AP 504 may respond with a BA 904A after the UL communication 514 is complete. After the BA 904A has been received by the STA 506C, the STA 506C may transmit a BAR 902B to the AP 504 on the channel 522, which is the channel that the DL communication 512 was received by the STA 506B. Once the AP 504 receives the BAR 902B, the AP 504 may respond with a BA 904B. The BAR and BA cycle then continues for the remaining STAs (for example, STA 506A and STA 506E). The AP 504 can instruct the STAs 506A-506E to set the acknowledgment policy of the data transmitted by the STAs 506A-506E such that no more than one STA 506A-506E requests an immediate BA. In some embodiments, all the BA policies can be set to BA (no immediate response required), but the AP can nevertheless select one or more STAs and send an immediate BA to them. The AP 504, after receiving an immediate acknowledgment request or BAR, may transmit the acknowledgment or BA on the same channel where data was received and/or on the primary channel. An additional BAR can be sent by the STAs 506A-506E on the primary channel and/or on one or more of the secondary channels, such as the same channel where data was transmitted. In this case, the AP 504 may transmit the acknowledgment or BA on the same channel where the BAR was received and/or on the primary channel.

In an embodiment, if the communications 510, 512, 514, and 518 end at or near the same time and/or where STAs 506A-506E can only receive on limited sub-channels, the AP 504 can respond with a BA on each sub-channel after the UL communications are complete (for example, end of transmission is a trigger for the AP 504 to send the BAs).

The BAs can be transmitted on the same channel as the channel where the UL communication was received. For example, as illustrated in FIG. 9B, the AP 504 response with a BA 904A-904D immediately after the UL communications 510, 512, 514, and 518 are complete. The BAs 904A-904D can be transmitted concurrently.

In embodiments where all STAs 506A-506E are able to decode a packet on any channel, or the primary channel 526, the AP 504 can broadcast a BBA after the UL communications 510, 512, 514, and 518 are complete. For example, as illustrated in FIG. 9C, the AP 504 transmits the BBA 904E on the primary channel 526 in response to the termination of the UL communications 510, 512, 514, and 518 are complete. Because all STAs 506A-506E can decode the BBA 904E, only one is transmitted. Where one of the STAs 506A-506E is a legacy STA, the AP 504 can instruct the high efficiency STAs to have a transmission that is shorter than a transmission of the legacy STA. The duration of transmission from the legacy STA can be inferred from a duration field set in an RTX frame. Moreover the AP 504 can instruct high-efficiency STAs to use a no-ACK policy.

Use Cases

In an embodiment, the UL FDM protocol described herein with respect to FIGS. 5A-9C is implemented in several applications. For example, a BSA may include legacy STAs and high-efficiency STAs. The UL FDM protocol may use otherwise unused bandwidth in the communication medium by assigning some of the STAs to a portion of the otherwise unused bandwidth. This may allow the legacy STAs and/or the high-efficiency STAs to communicate concurrently. This can be beneficial if the BSS range of the wireless network is restricted to high rate users.

As another example, frequency diversity can be achieved if the PHY layer uses a tone interleaved approach. With frequency diversity, a frequency hopping system is created that requires minimal interference coordination. Tones can be divided into two or more subsets. A first STA may transmit and/or receive data via tones in the first subset and a second STA may transmit and/or receive data via tones in the second subset. As long as the first subset and the second subset do not overlap, interference can be avoided.

Setup

In various embodiments, the UL FDMA transmission can indicate specific capabilities (for example, requested or required) to the STA. STAs that do not have the indicated capabilities may not use the UL FDMA transmission. Hence, the UL FDMA transmission may not be used by all the STAs.

In some embodiments, the AP can determine which STAs are potentially participating in the UL FDMA transmission. Each STA can indicate its capability by setting one or more bits in a Probe/Association request. In some embodiments, STAs can indicate the willingness to participate in UL FDMA transmission by sending a request to the AP through a management frame.

In various embodiments, the request can be carried in an additional information field during the setup of a traffic specification (TSPEC), for example, as defined by the IEEE 802.11 specification. In various embodiments, the request can also be carried during setup of an add BA (ADDBA) procedure. In various embodiments, the request can be carried though a new management agreement, wherein the STA sends a management frame to AP indicating the request and additional relevant parameters for the operation, such as transmit power capability, traffic pattern, QoS for which the procedure is requested, time to process the CTX, etc.

In some embodiments, the STA advertising a capability may not request the initiation of the use of UL FDMA. Instead, the AP may request the STA the parameters required for the UL FDMA operation. In some embodiments, the STA can be forced to accept the request. In some embodiments, the STA may reject the request. In various embodiments, the AP can also advertise its capability to receive UL FDMA transmissions. Such advertisement can be indicated by one or more bits in probe response, association response and/or beacons.

Operation

In various embodiments, all options discussed herein can be combined in an efficient way of using UL-FDMA. In particular, as described above, the AP can define dedicated intervals of time for DL/UL transmissions and for collecting requests from the STAs. In one embodiment, the AP can schedule the operations such that the following sequence of operations is achieved, wherein parentheses indicate optionality, brackets indicate that the enclosed sequence can be repeated multiple times within a beacon interval, and operations are separated by semicolons: Beacon; [(restricted access interval for PS-Polls or UL requests); restricted access interval for DL transmission; restricted access interval for UL transmissions]. In one embodiment, the AP can schedule the operations such that the following sequence of operations is achieved, wherein parentheses indicate optionality, brackets indicate that the enclosed sequence can be repeated multiple times within a beacon interval, and operations are separated by semicolons: Beacon; [(restricted access interval for PS-Polls); restricted access interval for DL transmission; (restricted access interval for UL request); restricted access interval for UL transmissions]. In one embodiment, the AP can schedule the operations as shown in FIG. 9D.

Figure 9D:
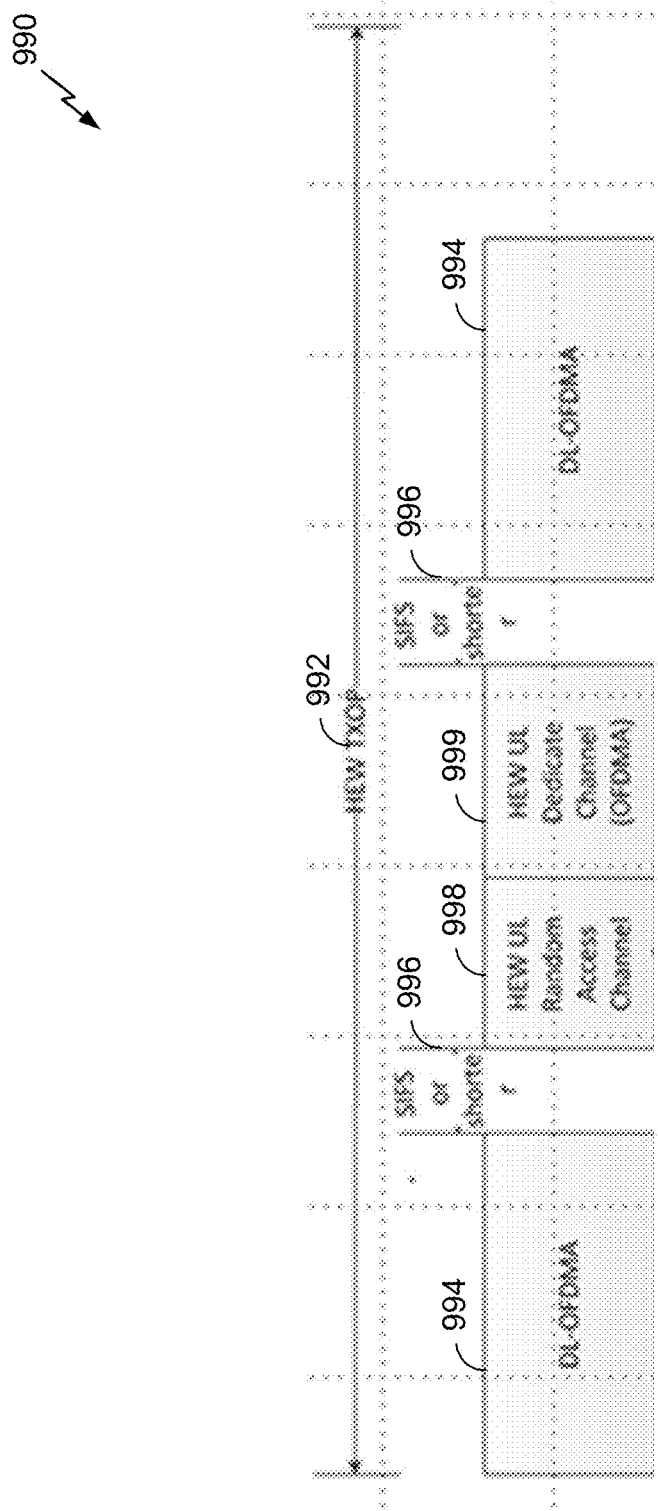

FIG. 9D shows an additional timing diagram 990 in which aspects of the present disclosure can be employed. In various embodiments, the AP can protect or hold the medium for the entire sequence by means of setting the NAV for all non-scheduled STAs or maintaining no more than SIFS or PIFS time of medium idle across the entire sequence. As shown in FIG. 9D, during a HEW transmit opportunity (TXOP) 992 includes restricted access intervals for DL transmission 994, SIFS time (or shorter period) 996, a HEW UL random access interval 998, and a HEW UL dedicated channel access interval 999.

As shown in FIG. 9D, the AP can gain access to the medium through regular contention or through a predefined schedule. The AP may then protect a certain interval of time referred to as transmission opportunity (TXOP) 992. The protection may be achieved by sending a frame that can set the NAV or through a scheduling that prevents certain undesired STAs to transmit during the TXOP 992. During the TXOP 992, the AP can schedule separate intervals of time for UL communication, DL communication, and for collecting requests from STAs for an UL communication. Within the UL communication interval, any of the modes described herein can be used for UL FDMA transmissions. Within the time reserved for indication of UL traffic, a STA may use any of the methods described herein (QoS Null, PS-Poll with uplink indication, and Data with More Data field set). Moreover the transmission of such indication may be scheduled by AP or can occur though contention. The AP can retain control on the medium by making sure that no time greater than SIFS or PIFS is unused within the TXOP 992.

Flowcharts

Figure 10:
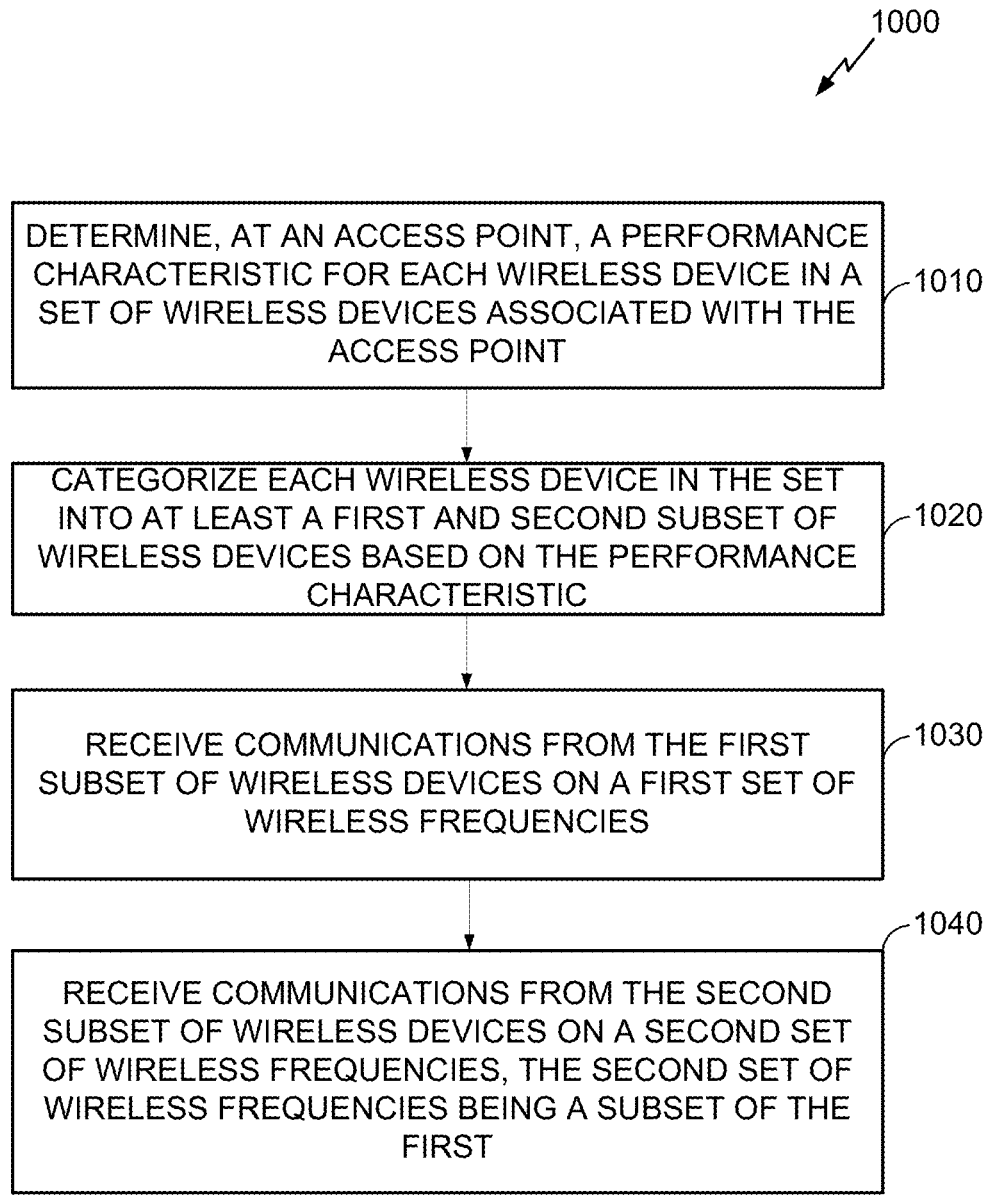
FIG. 10 shows a flowchart for an exemplary method of wireless communication that can be employed within the wireless communication system 500 of FIG. 5.

FIG. 10 shows a flowchart 1000 for an exemplary method of wireless communication that can be employed within the wireless communication system 500 of FIG. 5. The method can be implemented in whole or in part by the devices described herein, such as the wireless device 402 shown in FIG. 4. Although the illustrated method is described herein with reference to the wireless communication system 100 discussed above with respect to FIG. 1, the wireless communication systems 200, 250, 300, and 500 discussed above with respect to FIGS. 2-3 and 5A, and the wireless device 402 discussed above with respect to FIG. 4, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1010, an access point determines a performance characteristic for each wireless device in a set of wireless devices associated with the access point. For example, the AP 504 can determine one or more performance characteristics for each STA 506A-506E in the BSA 502. In various embodiments, the performance characteristic can include physical and/or RF characteristics such as, for example, a signal-to-interference-plus-noise ratio (SINR), an RF geometry, a received signal strength indicator (RSSI), a modulation and coding scheme (MCS) value, an interference level, a signal level, a transmission capability, etc.

Then, at block 1020, the access point categorizes each wireless device in the set into at least a first and second subset of wireless devices based on the performance characteristic. The first set of wireless devices can have a higher performance characteristic than the second set of wireless devices. For example, the AP 504 can categorize each STA 506A-506E in the BSA 502 into the first and second subsets. In an embodiment, the first subset of wireless devices can include inner-cell devices and the second subset of wireless devices can include cell-edge devices. For example, the AP 504 could categorize the STAs 506A-506C as inner-cell devices because they are physically close and might have strong signal strength. In contrast, the AP 504 could categorize the STAs 506D-506E as cell-edge devices because they are farther away and can might have a lower SINR.

In various embodiments, the first subset of wireless devices can have a higher signal-to-interference-plus-noise-ratio (SINR), a higher geometry rating, a higher received signal strength indicator (RSSI) than the second subset of wireless devices, or a greater transmission capability. In one embodiment, the first subset of wireless devices can have a higher modulation and coding scheme (MCS) value than the second subset of wireless devices. In one embodiment, the first subset of wireless devices can have a lower interference than the second subset of wireless devices.

In some embodiments, the access point can assign the second set of wireless frequencies to the second subset of wireless devices. For example, the AP 504 can assign the channel 526 to the STA 506E. The AP 504 can assign channels in coordination with other devices, based on observed interference, etc.

In some embodiments, the access point can receive an indication of the second set of wireless frequencies from at least one device in the second subset of wireless devices. For example, the STA 506E can make its own channel assignment, for example, based on observed interference. The STA 506E can transmit the channel assignment to the AP 504.

In some embodiments, the access point can transmit an indication of the second set of wireless frequencies to one or more devices not associated with the access point. For example, with reference to FIG. 2B, the AP 254A can make one or more channel assignments and can indicate the channel assignments of associated cell-edge devices to, for example, the AP 254C and/or the STA 256G. In some embodiments, the access point can receive an indication of the second set of wireless frequencies from one or more devices not associated with the access point. For example, the STA 256G could instead make one or more channel assignments and can notify the AP 254A and/or the STA 256A.

In some embodiments, at least one wireless device in the second subset of wireless devices can include a legacy device incapable of transmitting on the entire first subset of frequencies. Returning to FIG. 5A, for example, the STA 506E can be a legacy device. In some embodiments, the STA 506E can be incapable of transmitting on the entire first subset of frequencies such as, for example, where it must transmit on a primary channel.

In some embodiments, the access point can receive a ready-to-send (RTX) frame from at least one device in the second subset of wireless devices. For example, the STA 506E can generate the RTX 620 (FIG. 6F) and transmit it to the AP 604. In some embodiments, the access point can transmit a reference signal to at least one device in the second subset of wireless devices. For example, the AP 504 can transmit the reference signal CTX 601, in some instances in response to the RTX 620 by transmitting.

In various embodiments, the reference signal can include an indication of a deferral time for third party devices. In an embodiment, the reference signal can include an indication of devices that are eligible to transmit at a particular time. In an embodiment, the reference signal can include an assignment of channels to one or more devices in the second subset of wireless devices. For example, the extended payload 750 (FIG. 7A) can include one or more channel assignments or transmit authorizations. In some embodiments, the transmit authorizations can include a list of addresses of devices eligible to transmit at a particular time (for example, the next SIFS time). The transmit authorizations can include a group identifier defined in advance, for example, by the AP 504.

In an embodiment, the reference signal can include an indication of a power level at which at least one device should transmit. For example, the extended payload 750 can include an indication of a back-off from the STA's 506E nominal transmit power, which the STA 506E can indicate to the AP 504.

In various embodiments, the reference signal can include an indication of a transmission time of at least one device in the second subset of wireless devices. In an embodiment, the reference signal can include a clear-to-send frame (CTS). In an embodiment, the reference signal can include a clear-to-send frame (CTS) and an extended payload comprising one or more payload elements. In an embodiment, the reference signal can include a clear-to-send frame (CTS) comprising a high-throughput control (HTC) field indicating one or more target devices. In an embodiment, the reference signal can include an aggregated media access control protocol data unit (A-MPDU) comprising a clear-to-send frame (CTS) and one or more payload elements. For example, the reference signal can include the reference signal 700, described above with respect to FIG. 7A.

Next, at block 1130, the access point receives communications from the first subset of wireless devices on a first set of wireless frequencies. For example, the AP 504 can receive communications 510 from the STA 506A. In some embodiments, the communications 510 can utilize an entire available bandwidth (for example, channels 308, 310, 312, and 314 of FIG. 3). In some embodiments, the communications 510 can utilize only a portion of available bandwidth.

Thereafter, at block 1140, the access point receives communications from the second subset of wireless devices on a second set of wireless frequencies. The second set of wireless frequencies is a subset of the first. For example, the first subset can include channels 526, 524, and 522. The second subset can include channel 526. Accordingly, the AP 504 can receive the communication 518 from the STA 506E on the channel 526.

In other embodiments, the first and second sets of wireless frequencies can be mutually exclusive. For example, the first subset can include channels 522 and 520, and the second subset can include channels 526 and 524. Accordingly, the first set of wireless devices can contend normally for a portion of the available bandwidth while the second set of wireless devices can use FDMA to access another portion of the available bandwidth.

In some embodiments, the access point can concurrently receive communications from each device in the second subset of wireless devices. For example, the AP 504 can concurrently receive the communication 518 from the STA 506E on the channel 524, and can receive the communication 516 from the STA 506D on the channel 524 (not shown). In some embodiment, the access point can schedule a time at which to receive communications from the second subset of wireless devices.

In one embodiment, the access point can schedule a time at which to receive communications from the second subset of wireless devices and transmit a reference signal to at least one device in the second subset of wireless devices at the scheduled time. For example, at the scheduled transmit time, the AP 504 can transmit the reference signal 700 to synchronize the STAs 506A-506E. In one embodiment, the access point can receive, from at least one device in the second subset of wireless devices, an indication that the at least one device can be ready to send data. For example, the AP 504 can receive the RTX 620 from the STA 506E (FIG. 6F).

In some embodiments, the access point can receive, from at least one device in the second subset of wireless devices, a quality-of-service (QoS) field indicating that the at least one device can be ready to send data. For example, the STA 506E can transmit a QoS field to the AP 504 to indicate that it has data to transmit. In another embodiment, the access point can receive, from at least one device in the second subset of wireless devices, a power-save poll (PS-Poll) frame indicating that the at least one device can be ready to send data. For example, the STA 506E can transmit the PS-Poll frame to the AP 504 to indicate that it has data to transmit.

In various embodiments, the first subset of wireless frequencies can include a 20 or 40 or 80 MHz channel according to an Institute of Electrical and Electronics Engineers (IEEE) 802.11 standard. In various embodiments, the first and second subset of wireless frequencies can be within an operating bandwidth of the access point.

In various embodiments, the first and second communications start at the same time indicated by the reference signal, within a margin of transmission time error. For example, the margin of transmission time error can be a threshold value within which the first and second communications start at substantially the same time. In various embodiments, the first and second communications start at different times.

In various embodiments, the first and second communications end at the same time indicated by the reference signal, within a margin of transmission time error. For example, the margin of transmission time error can be a threshold value within which the first and second communications end at substantially the same time. In various embodiments, the first and second communications end at different times.

In various embodiments the reference can be sent by the access point according to a sense multiple access (CSMA) mechanism. In various embodiments the reference signal can be sent by the access point at a time previously scheduled with at least the first device via management signaling. In various embodiments, the reference signal is sent at least on a primary channel. In various embodiments, the reference signal is sent on a primary channel and on all or a portion of secondary channels that are idle for a sensing time before the transmission. In various embodiments, the reference signal is sent on channels compatible with the first and second devices.

In various embodiments, the at least the first device indicates to the access point a channel use capability. In various embodiments, the reference signal is sent on idle channels only. In various embodiments, the reference signal is sent on a primary channel only, with an indication that only idle channels are to be used.

In an embodiment, the method shown in FIG. 10 can be implemented in a wireless device that can include a determining circuit, a categorizing circuit, and a receiving circuit. Those skilled in the art will appreciate that a wireless device can have more components than the simplified wireless device described herein. The wireless device described herein includes only those components useful for describing some prominent features of implementations within the scope of the claims.

The determining circuit can be configured to determine the performance characteristic. In some embodiments, the generating circuit can be configured to perform at least block 1010 of FIG. 10. The determining circuit can include one or more of the processor 404 (FIG. 4), the DSP 420, the signal detector 418 (FIG. 4), the receiver 412 (FIG. 4), and the memory 406 (FIG. 4). In some implementations, means for determining can include the determining circuit.

The categorizing circuit can be configured to categorize each wireless device. In some embodiments, the categorizing circuit can be configured to perform at least block 1020 of FIG. 10. The categorizing circuit can include one or more of the processor 404 (FIG. 4), the DSP 420, and the memory 406 (FIG. 4). In some implementations, means for categorizing can include the categorizing circuit.

The receiving circuit can be configured to receive communications from the first and second subsets of wireless devices. In some embodiments, the receiving circuit can be configured to perform at least blocks 1030 and/or 1040 of FIG. 10. The receiving circuit can include one or more of the receiver 412 (FIG. 4), the antenna 416 (FIG. 4), and the transceiver 414 (FIG. 4). In some implementations, means for receiving can include the receiving circuit.

Figure 11:
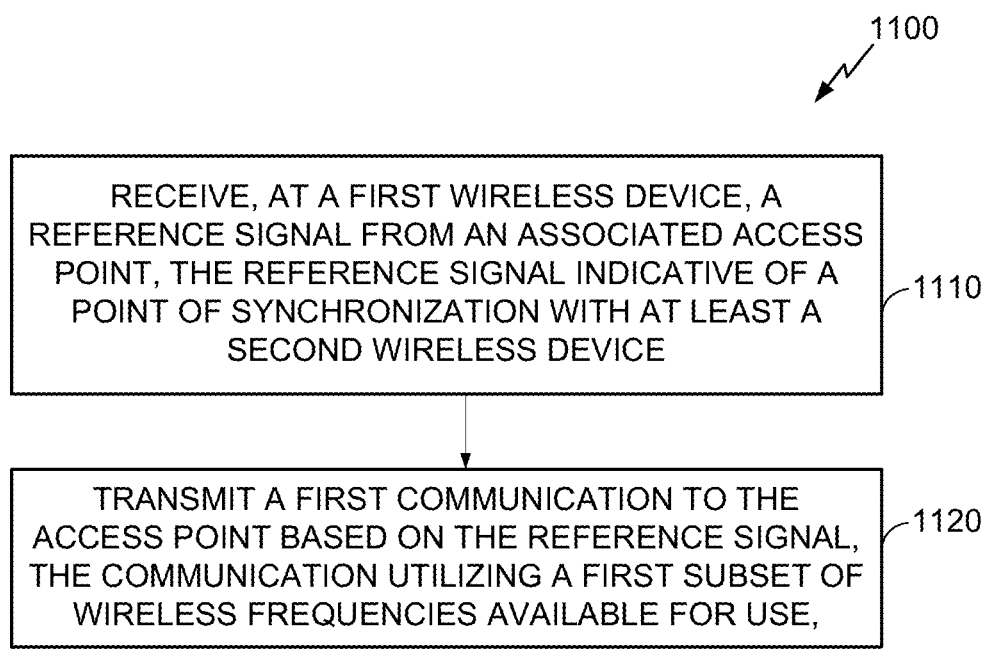
FIG. 11 shows a flowchart for another exemplary method of wireless communication that can be employed within the wireless communication system 500 of FIG. 5.

FIG. 11 shows a flowchart 1100 for another exemplary method of wireless communication that can be employed within the wireless communication system 500 of FIG. 5. The method can be implemented in whole or in part by the devices described herein, such as the wireless device 402 shown in FIG. 4. Although the illustrated method can be described herein with reference to the wireless communication system 110 discussed above with respect to FIG. 1, the wireless communication systems 200, 250, 300, and 500 discussed above with respect to FIGS. 2-3 and 5A, and the wireless device 402 discussed above with respect to FIG. 4, a person having ordinary skill in the art will appreciate that the illustrated method can be implemented by another device described herein, or any other suitable device. Although the illustrated method can be described herein with reference to a particular order, in various embodiments, blocks herein can be performed in a different order, or omitted, and additional blocks can be added.

First, at block 1110, a first wireless device receives a reference signal from an associated access point. The reference signal indicates of a time of joint transmission with at least a second wireless device. For example, the STA 506E can receive the reference signal CTX 601 (FIG. 6C) from the AP 504.

Then, at block 1120, the first wireless device transmits a first communication to the access point based on the reference signal. The communication utilizes a first subset of wireless frequencies available for use, and is concurrent with a second communication from the second wireless device. The second communication utilizes a second subset of wireless frequencies mutually exclusive with the first subset. For example, the STA 506E can transmit the communication 518 on the primary channel 526. Meanwhile, the STA 506A can transmit the communication 510 on the channel 524. The channel 524 includes a set of frequencies that is mutually exclusive with the set of frequencies in the channel 526. In an embodiment, the first wireless device can receive the reference signal on the second subset of wireless frequencies. For example, the STA 506E can receive the reference signal CTX 602 on the channel 524 (FIG. 6B), even though the STA 506E does not transmit on the secondary channel 524.

In an embodiment, the first wireless device can transmit a request for the reference signal to the access point. For example, the STA 506E can transmit the RTX 620 (FIG. 6F) on the channel 526. In an embodiment, the first wireless device can transmit a request for the reference signal to the access point on the second subset of wireless frequencies. For example, the STA 506E can transmit the RTX 620 on the channel 524 (FIG. 6D) even though the STA 506E does not transmit the communication 518 on the channel 524. In an embodiment, the first wireless device can transmit a ready-to-send (RTX) frame to the access point. For example, the STA 506E can transmit the RTX 620.

In an embodiment, the first wireless device can receive an indication of the first subset of wireless frequencies from the access point. For example, the AP 504 can assign the STA 506E the channel 526 for transmitting the communication 518. The AP 504 can indicate the channel 526 in, for example, the reference signal 700 described above with respect to FIG. 7A. In an embodiment, the first wireless device can receive an indication of the first set of wireless frequencies from one or more devices not associated with the access point. For example, with reference to FIG. 2B, the STA 256A can receive a channel assignment from the STA 256G and/or the AP 254C.

In an embodiment, the first wireless device can detect an interference level on one or more wireless frequencies and determine the first subset of wireless frequencies based on the interference level. For example, with reference to FIG. 6A, the STA 506E might detect relatively high interference levels on the channels 524, 522, and 520, as compared to the channel 526. Accordingly, the STA 506E might determine that it should transmit the communication 518 on the channel 526.

In an embodiment, the first wireless device can determine the first subset of wireless frequencies based on a tone interleaved channel with frequency hopping. For example, the STA 506E might determine to hop between the channel 524 and the channel 526. As another example, the channel 526 can include a tone interleaved channel with built-in frequency hopping. Accordingly, the STA 506E can stay on the channel 526 as the particular frequencies in channel 526 change.

In an embodiment, the first wireless device can transmit an indication of the first subset of wireless frequencies to the access point. For example, after the STA 506E determines it will transmit the communication 518 on the channel 526, it can transmit the channel selection to the AP 504, for example in a QoS field and/or a PS-Poll frame. In an embodiment, the first wireless device can transmit an indication of the first set of wireless frequencies to one or more devices not associated with the access point. For example, with reference to FIG. 2B, after the STA 256A chooses a channel, it can indicate the channel selection to the STA 256G and/or the AP 254C.

In an embodiment, the reference signal can include an indication of a deferral time for third party devices. In an embodiment, the reference signal can include an indication of devices that are eligible to transmit at a particular time. In an embodiment, the reference signal can include an indication of a power level at which at least one device should transmit.

In various embodiments, the reference signal can include an indication of a deferral time for third party devices. In an embodiment, the reference signal can include an indication of devices that are eligible to transmit at a particular time. In an embodiment, the reference signal can include an assignment of channels to one or more devices in the second subset of wireless devices. For example, the extended payload 750 (FIG. 7A) can include one or more channel assignments or transmit authorizations. In some embodiments, the transmit authorizations can include a list of addresses of devices eligible to transmit at a particular time (for example, the next SIFS time). The transmit authorizations can include a group identifier defined in advance, for example, by the AP 504.

In an embodiment, the reference signal can include an indication of a power level at which at least one device should transmit. For example, the extended payload 750 can include an indication of a back-off from the STA's 506E nominal transmit power, which the STA 506E can indicate to the AP 504.

In various embodiments, the reference signal can include an indication of a transmission time of at least one device in the second subset of wireless devices. In an embodiment, the reference signal can include a clear-to-send frame (CTS). In an embodiment, the reference signal can include a clear-to-send frame (CTS) and an extended payload comprising one or more payload elements. In an embodiment, the reference signal can include a clear-to-send frame (CTS) comprising a high-throughput control (HTC) field indicating one or more target devices. In an embodiment, the reference signal can include an aggregated media access control protocol data unit (A-MPDU) comprising a clear-to-send frame (CTS) and one or more payload elements. For example, the reference signal can include the reference signal 700, described above with respect to FIG. 7A.

In an embodiment, the first wireless device can schedule a time at which to transmit communications to the access point. In an embodiment, the first wireless device can transmit to the access point an indication that the first device can be ready to send data. In an embodiment, the first wireless device can transmit to the access point a quality-of-service (QoS) field indicating that the first device can be ready to send data. In an embodiment, the first wireless device can transmit to the access point a power-save poll (PS-Poll) frame indicating that the first device can be ready to send data. For example, the STA 506E can transmit the various messages discussed herein to the AP 504.

In an embodiment, the method shown in FIG. 11 can be implemented in a wireless device that can include a receiving circuit, and a transmitting circuit. Those skilled in the art will appreciate that a wireless device can have more components than the simplified wireless device described herein. The wireless device described herein includes only those components useful for describing some prominent features of implementations within the scope of the claims.

The receiving circuit can be configured to receive the reference signal. In some embodiments, the receiving circuit can be configured to perform at least block 1110 of FIG. 11. The receiving circuit can include one or more of the receiver 412 (FIG. 4), the antenna 416 (FIG. 4), and the transceiver 414 (FIG. 4). In some implementations, means for receiving can include the receiving circuit.

The transmitting circuit can be configured to transmit the first communication. In some embodiments, the transmitting circuit can be configured to perform at least block 1120 of FIG. 11. The transmitting circuit can include one or more of the transmitter 410 (FIG. 4), the antenna 416 (FIG. 4), and the transceiver 414 (FIG. 4). In some implementations, means for transmitting can include the transmitting circuit.

Figure 12:
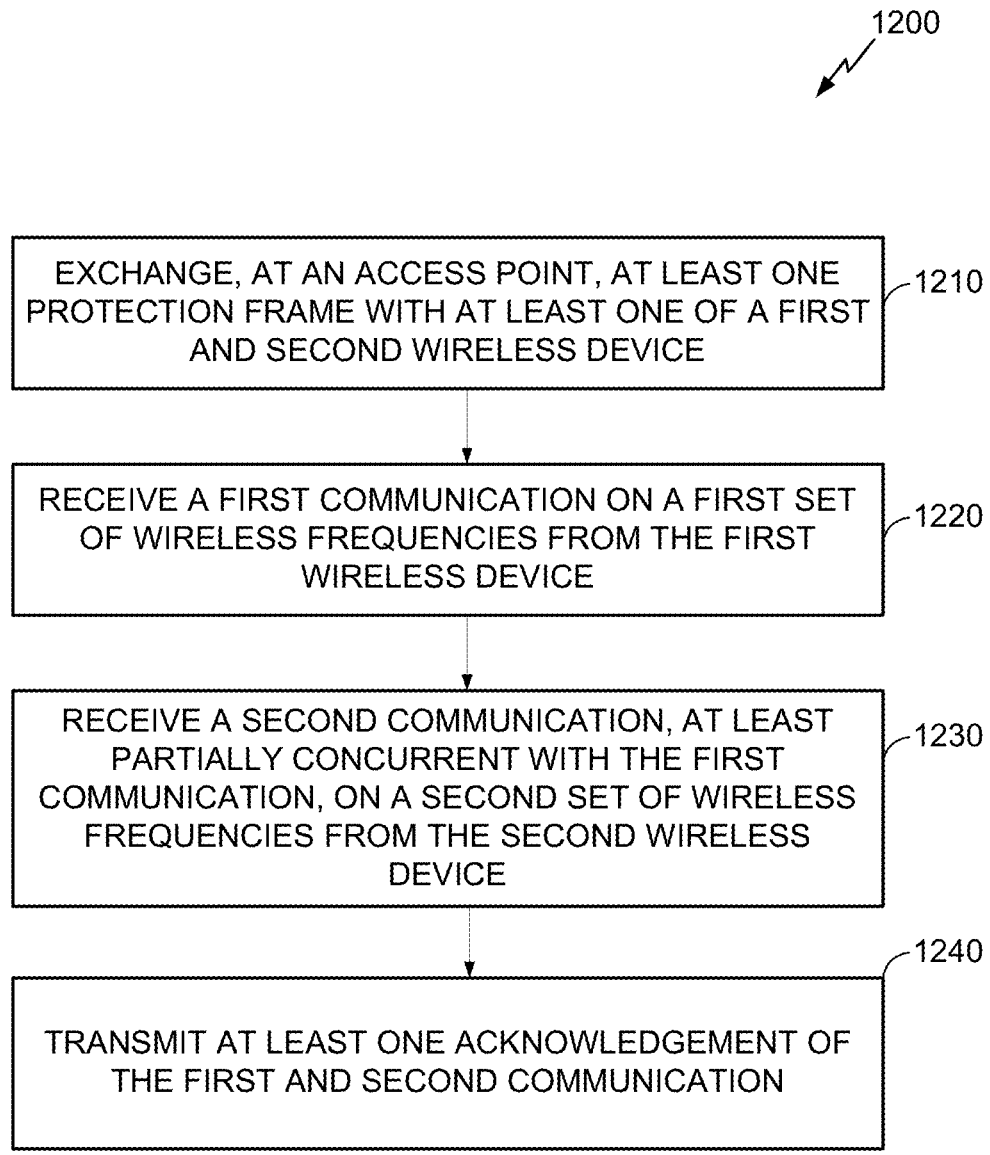
FIG. 12 shows a flowchart for an exemplary method of wireless communication that can be employed within the wireless communication system 500 of FIG. 5.

FIG. 12 shows a flowchart 1200 for an exemplary method of wireless communication that can be employed within the wireless communication system 500 of FIG. 5. The method can be implemented in whole or in part by the devices described herein, such as the wireless device 402 shown in FIG. 4. Although the illustrated method is described herein with reference to the wireless communication system 120 discussed above with respect to FIG. 1, the wireless communication systems 200, 250, 300, and 500 discussed above with respect to FIGS. 2-3 and 5A, and the wireless device 402 discussed above with respect to FIG. 4, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1210, the access point exchanges at least one protection frame with at least one of a first and second wireless device. In an embodiment, exchanging at least one protection frame can include receiving a ready-to-send (RTX) frame from at least one of the first and second device. In an embodiment, exchanging at least one protection frame can include transmitting a reference signal to the first and second device. For example, the AP 504 can exchange the RTX 620 and/or the reference signal CTX 602 (FIG. 6D) with the STAs 506A-506E.

In various embodiments, the reference signal can include an indication of a deferral time for third party devices. In an embodiment, the reference signal can include an indication of devices that are eligible to transmit at a particular time. In an embodiment, the reference signal can include an assignment of channels to one or more devices in the second subset of wireless devices. For example, the extended payload 750 (FIG. 7A) can include one or more channel assignments or transmit authorizations. In some embodiments, the transmit authorizations can include a list of addresses of devices eligible to transmit at a particular time (for example, the next SIFS time). The transmit authorizations can include a group identifier defined in advance, for example, by the AP 504.

In an embodiment, the reference signal can include an indication of a power level at which at least one device should transmit. For example, the extended payload 750 can include an indication of a back-off from the STA's 506E nominal transmit power, which the STA 506E can indicate to the AP 504.

In various embodiments, the reference signal can include an indication of a transmission time of at least one device in the second subset of wireless devices. In an embodiment, the reference signal can include a clear-to-send frame (CTS). In an embodiment, the reference signal can include a clear-to-send frame (CTS) and an extended payload comprising one or more payload elements. In an embodiment, the reference signal can include a clear-to-send frame (CTS) comprising a high-throughput control (HTC) field indicating one or more target devices. In an embodiment, the reference signal can include an aggregated media access control protocol data unit (A-MPDU) comprising a clear-to-send frame (CTS) and one or more payload elements. For example, the reference signal can include the reference signal 700, described above with respect to FIG. 7A.

In an embodiment, the access point can assign the first and/or second set of wireless frequencies to the first and/or second device, respectively. For example, the AP 504 can assign the channel 526 to the STA 506E. The AP 504 can assign channels in coordination with other devices, based on observed interference, etc. In an embodiment, the access point can receive an indication of the first and/or second set of wireless frequencies from the first and/or second device, respectively. For example, the STA 506E can make its own channel assignment, for example, based on observed interference. The STA 506E can transmit the channel assignment to the AP 504.

In an embodiment, the first wireless device can include a legacy device incapable simultaneously transmitting on the entire set of wireless frequencies available for use by both the first and second wireless device. Returning to FIG. 5A, for example, the STA 506E can be a legacy device. In some embodiments, the STA 506E can be incapable of transmitting on the entire first subset of frequencies such as, for example, where it must transmit on a primary channel.

Then, at block 1220, the access point receives a first communication on a first set of wireless frequencies from the first wireless device. For example, the AP 504 can receive the communication 518 from the STA 506E on the primary channel 526.

Next, at block 1230, the access point receives a second communication, at least partially concurrent with the first communication, on a second set of wireless frequencies from the second wireless device. The first set and the second set are mutually exclusive subsets of a set of wireless frequencies available for use by both the first and second wireless device. For example, the AP 504 can receive the communication 510 from the STA 506A on the channel 524. The frequencies of the channels 526 and 526 are mutually exclusive.

Thereafter, at block 1240, the access point transmits at least one acknowledgment of the first and second communication. For example, the AP 504 can transmit the BA 904A (FIG. 9A). In an embodiment, the access point transmits a single broadcast acknowledgment on only the first subset of frequencies. For example, the AP 504 can transmit only the BBA 904E (FIG. 9C) on the primary channel 526. In an embodiment, the access point receives an acknowledgment request and transmits the acknowledgment in response to the acknowledgment request. For example, the AP 504 can receive a BAR 902B (FIG. 9A) from the STA 506B on the channel 522, and can respond with the BA 904B on the channel 522.

In some embodiment, the access point can schedule a time at which to receive communications from the second subset of wireless devices. In one embodiment, the access point can schedule a time at which to receive communications from the second subset of wireless devices and transmit a reference signal to at least one device in the second subset of wireless devices at the scheduled time. For example, at the scheduled transmit time, the AP 504 can transmit the reference signal 700 to synchronize the STAs 506A-506E. In one embodiment, the access point can receive, from at least one device in the second subset of wireless devices, an indication that the at least one device can be ready to send data. For example, the AP 504 can receive the RTX 620 from the STA 506E (FIG. 6F).

In some embodiments, the access point can receive, from at least one device in the second subset of wireless devices, a quality-of-service (QoS) field indicating that the at least one device can be ready to send data. For example, the STA 506E can transmit a QoS field to the AP 504 to indicate that it has data to transmit. In another embodiment, the access point can receive, from at least one device in the second subset of wireless devices, a power-save poll (PS-Poll) frame indicating that the at least one device can be ready to send data. For example, the STA 506E can transmit the PS-Poll frame to the AP 504 to indicate that it has data to transmit.

In an embodiment, the method shown in FIG. 12 can be implemented in a wireless device that can include an exchanging circuit, a receiving circuit, and a transmitting circuit. Those skilled in the art will appreciate that a wireless device can have more components than the simplified wireless device described herein. The wireless device described herein includes only those components useful for describing some prominent features of implementations within the scope of the claims.

The exchanging circuit can be configured to exchange the protection frame. In some embodiments, the exchanging circuit can be configured to perform at least block 1210 of FIG. 12. The exchanging circuit can include one or more of the transmitter 410 (FIG. 4), the receiver 412 (FIG. 4), the antenna 416 (FIG. 4), and the transceiver 414 (FIG. 4). In some implementations, means for exchanging can include the exchanging circuit.

The receiving circuit can be configured to receive communications from the first and second wireless devices. In some embodiments, the receiving circuit can be configured to perform at least blocks 1220 and/or 1230 of FIG. 12. The receiving circuit can include one or more of the receiver 412 (FIG. 4), the antenna 416 (FIG. 4), and the transceiver 414 (FIG. 4). In some implementations, means for receiving can include the receiving circuit.

The transmitting circuit can be configured to transmit the acknowledgment. In some embodiments, the transmitting circuit can be configured to perform at least block 1240 of FIG. 12. The transmitting circuit can include one or more of the transmitter 410 (FIG. 4), the antenna 416 (FIG. 4), and the transceiver 414 (FIG. 4). In some implementations, means for transmitting can include the transmitting circuit.

As used herein, the term "determining" encompasses a wide variety of actions. For example, "determining" may include calculating, computing, processing, deriving, investigating, looking up (for example, looking up in a table, a database or another data structure), ascertaining and the like. Also, "determining" may include receiving (for example, receiving information), accessing (for example, accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor may also be implemented as a combination of computing devices, for example, a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium may comprise non-transitory computer readable medium (for example, tangible media). In addition, in some aspects computer readable medium may comprise transitory computer readable medium (for example, a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (for example, RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations can be made in the arrangement, operation and details of the methods and apparatus described above without departing from the scope of the claims.

While the foregoing is directed to aspects of the present disclosure, other and further aspects of the disclosure can be devised without departing from the basic scope thereof, and the scope thereof is determined by the claims that follow.

What is claimed is:

1. A method of high-efficiency wireless frequency division multiplexing, comprising:
   receiving, at a first wireless device, a reference signal from an associated access point, the reference signal indicative of a time of joint transmission with at least a second wireless device and a deferral time for third party devices, the reference signal comprising one or more station information fields, a frame check sequence (FCS), and one or more padding bits between a final station information field and the FCS, the reference signal only being sent on a primary channel with an indication that only idle channels are to be used; and
   transmitting a first communication to the associated access point based on the reference signal, the first communication utilizing a first subset of wireless frequencies and being concurrent with a second communication from the second wireless device, the second communication utilizing a second subset of wireless frequencies, the second subset of wireless frequencies excluding the first subset of wireless frequencies.

2. The method of claim 1, further comprising transmitting the reference signal in response to reception of a ready-to-send (RTX) frame at the associated access point, the reference signal comprising a ready-to-send (RTX) frame comprising one or more of: a frame control field, a duration field, a source address field, a destination address field, and an information payload comprising one or more of the following indications: a requested transmission time, the size of the queues for transmission, a quality-of-service (QoS) indication for the requested transmission, and a requested transmission bandwidth.

3. The method of claim 1, the reference signal comprising a clear-to-send (CTS) comprising a frame including a high throughput control (HTC) field with an indication reverse decision grant (RDG)=1.

4. The method of claim 1, the reference signal comprising a frame including a high throughput control (HTC) field with an indication reverse decision grant (RDG)=1.

5. The method of claim 1, the reference signal comprising at least a portion of a power save multi-poll (PSMP) frame, a PSMP-UTT start offset within a STA info field identifying the start time for uplink frequency division multiple access (UL FDMA) transmissions, a PSMP-UTT duration identifies the duration of the UL FDMA transmission, and a STA ID field comprising an identifier of STAs allowed to transmit.

6. The method of claim 1, the reference signal further comprising a frame control field, a duration field, a receive address field, a transmit address field, and a length field.

7. The method of claim 1, the reference signal including an indication of the first subset of wireless frequencies.

8. The method of claim 1, further comprising detecting an interference level on one or more wireless frequencies and determining the first subset of wireless frequencies based on the interference level.

9. The method of claim 1, further comprising determining the first subset of wireless frequencies based on a tone interleaved channel with frequency hopping.

10. The method of claim 1, the reference signal including an indication of the first subset of wireless frequencies, and the method further comprising transmitting the indication of the first subset of wireless frequencies to one or more devices not associated with the associated access point.

11. The method of claim 1, the reference signal comprising an indication of devices that are eligible to transmit at a particular time.

12. The method of claim 1, the reference signal comprising an indication of a power level at which at least one device should transmit.

13. The method of claim 1, the reference signal comprising an assignment of channels to at least the first wireless device.

14. The method of claim 1, the reference signal comprising an indication of a transmission time of at least the first wireless device.

15. The method of claim 1, the reference signal comprising a clear-to-send frame (CTS).

16. The method of claim 1, the reference signal comprising a clear-to-send frame (CTS) and an extended payload comprising one or more payload elements.

17. The method of claim 1, the reference signal comprising a clear-to-send frame (CTS) comprising a high-throughput control (HTC) field indicating one or more target devices.

18. The method of claim 1, the reference signal comprising an aggregated media access control protocol data unit (A-MPDU) comprising a clear-to-send frame (CTS) and one or more payload elements.

19. The method of claim 1, further comprising transmitting to the associated access point a quality-of-service (QoS) field indicating that the first device is ready to send data.

20. The method of claim 1, further comprising transmitting to the associated access point a power-save poll (PS-Poll) frame indicating that the first device is ready to send data.

21. The method of claim 1, wherein the first subset of wireless frequencies comprises a 20 or 40 or 80 MHz channel according to an Institute of Electrical and Electronics Engineers (IEEE) 802.11 standard.

22. The method of claim 1, wherein the first and second subset of wireless frequencies are within an operating bandwidth of the associated access point.

23. The method of claim 1, wherein the first and second communications start at the time of joint transmission indicated by the reference signal, within a margin of transmission time error.

24. The method of claim 1, wherein the first and second communications start at different times.

25. The method of claim 1, wherein the first and second communications end at the time of joint transmission indicated by the reference signal, within a margin of transmission time error.

26. The method of claim 1, wherein the first and second communications end at different times.

27. The method of claim 1, the reference signal being sent by the associated access point according to a sense multiple access (CSMA) mechanism.

28. The method of claim 1, the reference signal being sent by the associated access point at a time previously scheduled with at least the first device via management signaling.

29. The method of claim 1, the reference signal comprising management signaling indicating one or more future times of joint transmission.

30. The method of claim 1, wherein the reference signal is sent at least on a primary channel.

31. The method of claim 1, wherein the reference signal is sent on a primary channel and on all or a portion of secondary channels that are idle for a sensing time before the transmission.

32. The method of claim 1, wherein the reference signal is sent on channels compatible with the first and second devices.

33. The method of claim 1, wherein at least the first device indicates to the associated access point a channel use capability.

34. The method of claim 1, wherein the reference signal is sent on idle channels only.

35. A first wireless device configured to perform high-efficiency wireless frequency division multiplexing, comprising:
a receiver configured to receive a reference signal from an associated access point, the reference signal indicative of a time of joint transmission with at least a second wireless device and a deferral time for third party devices, the reference signal comprising one or more station information fields, a frame check sequence (FCS), and one or more padding bits between a final station information field and the FCS, the reference signal only being sent on a primary channel with an indication that only idle channels are to be used; and
a transmitter configured to transmit a first communication to the associated access point based on the reference signal, the first communication utilizing a first subset of wireless frequencies and being concurrent with a second communication from the second wireless device, the second communication utilizing a second subset of wireless frequencies, the second subset of wireless frequencies excluding the first subset of wireless frequencies.

36. The device of claim 35, the transmitter being further configured to transmit the reference signal in response to reception of a ready-to-send (RTX) frame at the associated access point, the reference signal comprising a ready-to-send (RTX) frame comprising one or more of: a frame control field, a duration field, a source address field, a destination address field, and an information payload comprising one or more of the following indications: a requested transmission time, the size of the queues for transmission, a quality-of-service (QoS) indication for the requested transmission, and a requested transmission bandwidth.

37. The device of claim 35, the reference signal comprising a clear-to-send (CTS) frame comprising a frame including a high throughput control (HTC) field with an indication reverse decision grant (RDG)=1.

38. The device of claim 35, the reference signal comprising a frame including a high throughput control (HTC) field with an indication reverse decision grant (RDG)=1.

39. The device of claim 35, the reference signal comprising at least a portion of a power save multi-poll (PSMP) frame, a PSMP-UTT start offset within a STA info field identifying the start time for uplink frequency division multiple access (UL FDMA) transmissions, a PSMP-UTT duration identifies the duration of the UL FDMA transmission, and a STA ID field comprising an identifier of STAs allowed to transmit.

40. The device of claim 35, the reference signal further comprising a frame control field, a duration field, a receive address field, a transmit address field, and a length field.

41. The device of claim 35, the reference signal including an indication of the first subset of wireless frequencies.

42. The device of claim 35, further comprising a processor configured to detect an interference level on one or more wireless frequencies and determining the first subset of wireless frequencies based on the interference level.

43. The device of claim 35, further comprising a processor configured to determine the first subset of wireless frequencies based on a tone interleaved channel with frequency hopping.

44. The device of claim 35, the reference signal including an indication of the first subset of wireless frequencies, and the transmitter being further configured to transmit the indication of the first subset of wireless frequencies to one or more devices not associated with the associated access point.

45. The device of claim 35, the reference signal comprising an indication of devices that are eligible to transmit at a particular time.

46. The device of claim 35, the reference signal comprising an indication of a power level at which at least one device should transmit.

47. The device of claim 35, the reference signal comprising an assignment of channels to at least the first wireless device.

48. The device of claim 35, the reference signal comprising an indication of a transmission time of at least the first wireless device.

49. The device of claim 35, the reference signal comprising a clear-to-send frame (CTS).

50. The device of claim 35, the reference signal comprising a clear-to-send frame (CTS) and an extended payload comprising one or more payload elements.

51. The device of claim 35, the reference signal comprising a clear-to-send frame (CTS) comprising a high-throughput control (HTC) field indicating one or more target devices.

52. The device of claim 35, the reference signal comprising an aggregated media access control protocol data unit (A-MPDU) comprising a clear-to-send frame (CTS) and one or more payload elements.

53. The device of claim 35, the transmitter being further configured to transmit to the associated access point a quality-of-service (QoS) field indicating that the first device is ready to send data.

54. The device of claim 35, the transmitter being further configured to transmit to the associated access point a power-save poll (PS-Poll) frame indicating that the first device is ready to send data.

55. The device of claim 35, wherein the first subset of wireless frequencies comprises a 20 or 40 or 80 MHz channel according to an Institute of Electrical and Electronics Engineers (IEEE) 802.11 standard.

56. The device of claim 35, wherein the first and second subset of wireless frequencies are within an operating bandwidth of the associated access point.

57. The device of claim 35, wherein the first and second communications start at the time of joint transmission indicated by the reference signal, within a margin of transmission time error.

58. The device of claim 35, wherein the first and second communications start at different times.

59. The device of claim 35, wherein the first and second communications end at the time of joint transmission indicated by the reference signal, within a margin of transmission time error.

60. The device of claim 35, wherein the first and second communications end at different times.

61. The device of claim 35, the reference signal being sent by the associated access point according to a sense multiple access (CSMA) mechanism.

62. The device of claim 35, the reference signal being sent by the associated access point at a time previously scheduled with at least the first device via management signaling.

63. The device of claim 35, the reference signal comprising management signaling indicating one or more future times of joint transmission.

64. The device of claim 35, wherein the reference signal is sent at least on a primary channel.

65. The device of claim 35, wherein the reference signal is sent on a primary channel and on all or a portion of secondary channels that are idle for a sensing time before the transmission.

66. The device of claim 35, wherein the reference signal is sent on channels compatible with the first and second devices.

67. The device of claim 35, wherein at least the first device indicates to the associated access point a channel use capability.

68. The device of claim 35, wherein the reference signal is sent on idle channels only.

69. An apparatus for high-efficiency wireless frequency division multiplexing, comprising:

means for receiving, at a first wireless device, a reference signal from an associated access point, the reference signal indicative of a time of joint transmission with at least a second wireless device and a deferral time for third party devices, the reference signal comprising one or more station information fields, a frame check sequence (FCS), and one or more padding bits between a final station information field and the FCS, the reference signal only being sent on a primary channel with an indication that only idle channels are to be used; and means for transmitting a first communication to the associated access point based on the reference signal, the first communication utilizing a first subset of wireless frequencies and being concurrent with a second communication from the second wireless device, the second communication utilizing a second subset of wireless frequencies, the second subset of wireless frequencies excluding the first subset of wireless frequencies.

70. A non-transitory computer-readable medium comprising code that, when executed, causes an apparatus to:

receive, at a first wireless device, a reference signal from an associated access point, the reference signal indicative of a time of joint transmission with at least a second wireless device and a deferral time for third party devices, the reference signal comprising one or more station information fields, a frame check sequence (FCS), and one or more padding bits between a final station information field and the FCS, the reference signal only being sent on a primary channel with an indication that only idle channels are to be used; and transmit a first communication to the associated access point based on the reference signal, the first communication utilizing a first subset of wireless frequencies and being concurrent with a second communication from the second wireless device, the second communication utilizing a second subset of wireless frequencies, the second subset of wireless frequencies excluding the first subset of wireless frequencies.

* * * * *